US012808790B2

(12) United States Patent
Wan et al.

(10) Patent No.: US 12,808,790 B2
(45) Date of Patent: Nov. 24, 2026

(54) GAS DETECTION DEVICE

(71) Applicant: HANGZHOU SANHUA RESEARCH INSTITUTE CO., LTD., Hangzhou City (CN)

(72) Inventors: Xia Wan, Hangzhou City (CN); Jiajun Zhang, Hangzhou City (CN); Yuxiang Zhang, Hangzhou City (CN); Longzhong Huang, Hangzhou City (CN); Qihong Jin, Hangzhou City (CN); Lin-Jie Huang, Hangzhou City (CN)

(73) Assignee: HANGZHOU SANHUA RESEARCH INSTITUTE CO., LTD., Hangzhou City (CN)

( * ) Notice: Subject to any disclaimer, the term of this patent is extended or adjusted under 35 U.S.C. 154(b) by 197 days.

(21) Appl. No.: 18/731,342

(22) PCT Filed: Jan. 9, 2023

(86) PCT No.: PCT/CN2023/071454
§ 371 (c)(1),
(2) Date: Jun. 2, 2024

(87) PCT Pub. No.: WO2023/131334
PCT Pub. Date: Jul. 13, 2023

(65) Prior Publication Data

US 2026/0168923 A1 Jun. 18, 2026

(30) Foreign Application Priority Data

Jan. 10, 2022 (CN) ......................... 202210021945.6
Mar. 17, 2022 (CN) ......................... 202220581346.5
Aug. 31, 2022 (CN) ......................... 202211059487.1

(51) Int. Cl.
*G01N 21/3504* (2014.01)

(52) U.S. Cl.
CPC ................................ *G01N 21/3504* (2013.01)

(58) Field of Classification Search
CPC .................................................. G01N 21/3504
See application file for complete search history.

(56) References Cited

U.S. PATENT DOCUMENTS

2007/0114421 A1* 5/2007 Maehlich ........... G01N 21/3504 250/343
2011/0238334 A1 9/2011 Martin
2021/0156795 A1 5/2021 Wan et al.

FOREIGN PATENT DOCUMENTS

CN 102507494 A 6/2012
CN 206223723 U 6/2017
(Continued)

*Primary Examiner* — Kiho Kim
(74) *Attorney, Agent, or Firm* — Cheng-Ju Chiang

(57) ABSTRACT

A gas detection device includes a housing, a circuit board and a detection unit. The detection unit includes a detection housing, a light source module and a detection probe. The light source module and the detection probe are disposed at two ends of the detection housing, and are electrically connected to the circuit board. A first straight line and a second straight line are defined on a plane perpendicular to a height direction of the gas detection device. The detection housing has a first projection on this plane. The first straight line extends along a length direction of the first projection. The second straight line extends along a width direction or a length direction of the gas detection device. The first straight line is inclined at an acute angle relative to the second straight line. As a result, the detection accuracy of the gas detection device is improved.

19 Claims, 17 Drawing Sheets

(56) References Cited

FOREIGN PATENT DOCUMENTS

| | | | | | |
|---|---|---|---|---|---|
| CN | 107917888 | A | | 4/2018 | |
| CN | 109781651 | A | | 5/2019 | |
| CN | 209624546 | U | | 11/2019 | |
| CN | 110646363 | A | | 1/2020 | |
| CN | 211116132 | U | | 7/2020 | |
| CN | 211148590 | U | | 7/2020 | |
| CN | 111562232 | A | | 8/2020 | |
| CN | 111693480 | A | * | 9/2020 | ......... G01N 21/3504 |
| CN | 212207094 | U | | 12/2020 | |
| CN | 112198134 | A | * | 1/2021 | ......... G01N 21/3504 |
| CN | 212301401 | U | | 1/2021 | |
| CN | 112945890 | A | | 6/2021 | |
| CN | 113009064 | A | | 6/2021 | |
| CN | 214150597 | U | | 9/2021 | |
| CN | 214252006 | U | | 9/2021 | |
| CN | 113514405 | A | | 10/2021 | |
| CN | 215415023 | U | | 1/2022 | |
| CN | 216350333 | U | | 4/2022 | |
| CN | 114487293 | A | | 5/2022 | |
| CN | 217586904 | U | | 10/2022 | |
| CN | 116456635 | A | | 7/2023 | |
| JP | 2021-67634 | A | | 4/2021 | |
| KR | 10-1499691 | B1 | | 3/2015 | |
| KR | 10-2020-0019033 | A | | 2/2020 | |
| WO | 2023/131334 | A1 | | 7/2023 | |

* cited by examiner

GAS DETECTION DEVICE

CROSS-REFERENCE TO RELATED APPLICATIONS

The present application is a bypass continuation-in-part of National Phase conversion of International (PCT) Patent Application No. PCT/CN2023/071454, filed on Jan. 9, 2023, which further claims priority of a Chinese Patent Application No. 202210021945.6, filed on Jan. 10, 2022 and titled "GAS DETECTION DEVICE", a Chinese Patent Application No. 202220581346.5, filed on Mar. 17, 2022 and titled "OPTICAL GAS SENSOR", and a Chinese Patent Application No. 202211059487.1, filed on Aug. 31, 2022 and titled "GAS SENSOR", the entire content of which is incorporated herein by reference.

TECHNICAL FIELD

The present disclosure relates to the field of measurement technology, and in particular to a gas detection device.

BACKGROUND

Related technologies include a gas detection device based on optical detection principles, including a housing and a detection module located in the housing. The detection module includes a straight-cylindrical detection housing, a light source, a detection probe and other components. The light source and detection probe are respectively located at two ends of the detection housing in a length direction of the detection housing. The light emitted by the light source is incident on the detection probe almost along a straight line. The target gas entering the detection gas chamber absorbs light of a specific wavelength. The detection probe can calculate the concentration of the target gas and other information by detecting changes in light intensity.

In some application scenarios where the mounting space of the gas detection device is limited, it is difficult for the straight-cylindrical detection housing to reach the ideal length. Correspondingly, it will affect the light absorption effect of the target gas. Therefore, there is still room for improvement in the detection accuracy of the gas detection device.

SUMMARY

The present disclosure provides gas detection device, including: a housing, a circuit board and a detection unit; at least part of the circuit board and at least part of the detection unit being located in the housing; the detection unit being mounted to the circuit board;

wherein the detection unit includes a detection housing, a light source module and a detection probe; the light source module is provided at one end of the detection housing in a length direction of the detection housing to emit light; the detection probe is provided at another end of the detection housing in the length direction of the detection housing to receive the light; the light source module and the detection probe are electrically connected to the circuit board, respectively;

a first straight line and a second straight line are defined on a plane perpendicular to a height direction of the gas detection device; the detection housing has a first projection on the plane; the first straight line extends along a length direction of the first projection; the second straight line extends along a width direction or a length direction of the gas detection device; the first straight line is inclined at an acute angle relative to the second straight line.

Compared with the related art, in the present disclosure, the first straight line extends along the length direction of the first projection, the second straight line extends along the width direction or the length direction of the gas detection device, and the first straight line is inclined at the acute angle relative to the second straight line. As a result, it is beneficial to expand the mounting space of the detection unit. Correspondingly, it is beneficial to extend the distance between the light source module and the detection probe, and improve the light absorption effect of the target gas, thereby improving the detection accuracy of the gas detection device.

DETAILED DESCRIPTION

Figure 1:
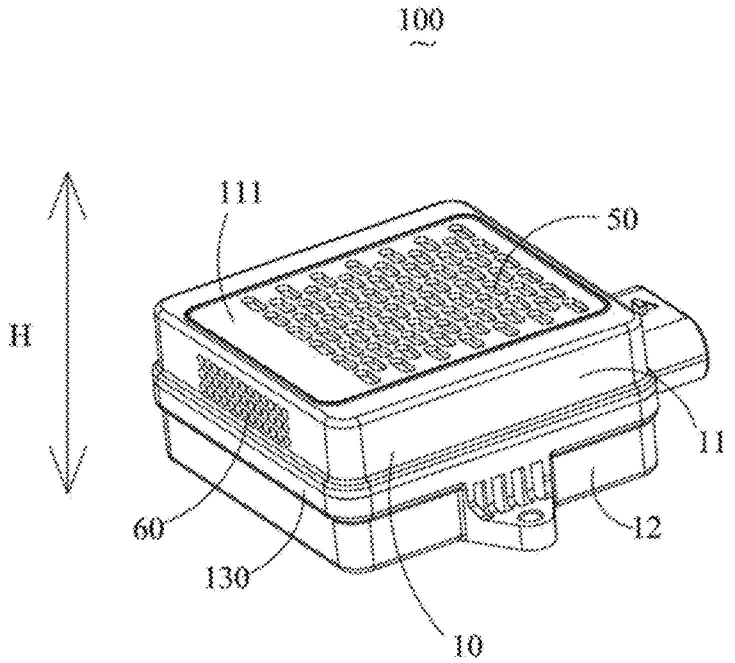
FIG. 1 is a perspective schematic view of a gas detection device of the present disclosure.

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those of ordinary skill in the art without creative efforts fall within the scope of protection of the present disclosure.

Exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present invention are only for the purpose of describing specific embodiments, and are not intended to limit the present invention. The singular forms of "a", "said" and "the" used in the present invention and appended claims are also intended to include plural forms, unless the context clearly indicates otherwise. It should also be understood that the term "and/or" as used herein refers to and includes any or all possible combinations of one or more associated listed items.

It should be understood that although the terms "first", "second", "third", etc., may be used in the present invention to describe various information, the information should not be limited to these terms. These terms are only used to distinguish the same type of information from each other. For example, without departing from the scope of the present invention, a first information may also be referred to as a second information. Similarly, the second information may also be referred to as the first information. Depending on the context, the word "if" as used herein can be interpreted as "when" or "during" or "depending on".

The gas detection device of the present invention will be described in detail below with reference to the accompanying drawings. Features in the following embodiments and implementations may be combined with each other without conflict.

With the advancement of environmentally friendly refrigerants replacing traditional refrigerants, the industry has discovered that some environmentally friendly refrigerants are more flammable than traditional refrigerants, thus posing safety risks to air conditioning systems. Therefore, it is necessary to detect whether the refrigerant is leaking through a gas concentration detection device so that an air conditioning control system can shut down and alarm in time to reduce the safety hazards caused by the environmentally friendly refrigerant.

As shown in FIG. 1 to FIG. 29, a gas detection device 100 in line with the present disclosure is shown, which includes: a housing 10, a circuit board assembly 20, a waterproof and breathable membrane 30, and a support member 40. The circuit board assembly 20 includes a detection unit 21 and a circuit board 22. The gas detection device 100 further defines an inner cavity 200 so that at least part of the circuit board assembly 20 can be received in the inner cavity 200. In some embodiments, the gas detection device 100 can be used to detect concentration of a gaseous refrigerant, so that when the refrigerant leaks in an air conditioning system, it can be promptly detected and fed back to a control system of an air conditioner, thereby reducing the safety risks caused by the refrigerant leakage. Of course, in other embodiments, the gas detection device 100 can also be used in other environments to detect other gases, such as methane, ethane, carbon dioxide and other gases. The present disclosure does not impose too many restrictions on this.

Figure 2:
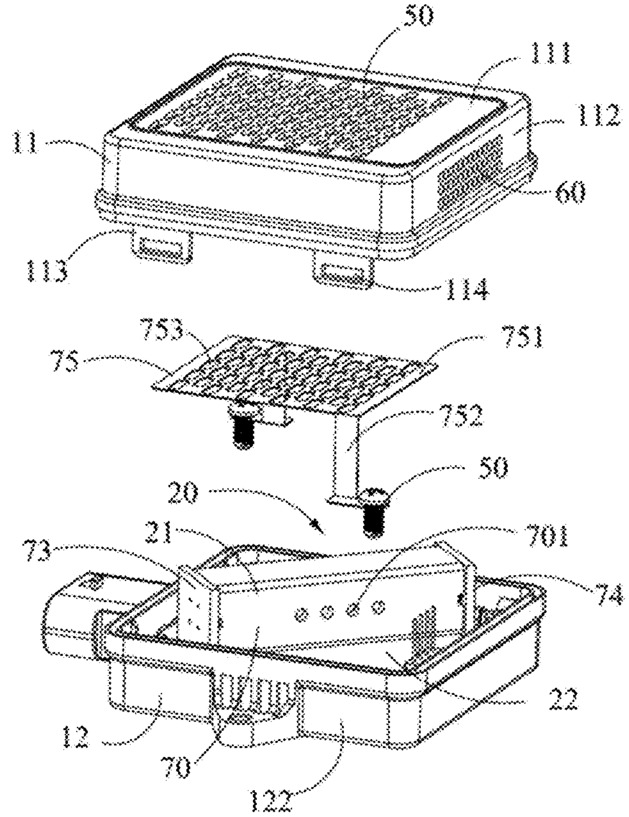
FIG. 2 is an exploded schematic view of the gas detection device shown in FIG. 1.

As shown in FIG. 2, the detection unit 21 is mounted on the circuit board 22. The detection unit 21 is used to detect the concentration of a gas refrigerant (such as R32, R454B and other environmentally friendly refrigerants). The detection unit 21 illustrated in the embodiment of the present disclosure adopts the detection unit 21 based on the optical detection principle. Specifically, the detection unit 21 can adopt the infrared light detection principle. In other embodiments, the detection unit 21 may also be of semiconductor type, thermal conductivity type, electrochemical type, catalytic combustion type, ultrasonic type, etc., according to its working principle.

Referring to FIG. 8 to FIG. 11, the circuit board 22 further includes a processing chip 23 and a plurality of electronic components 24. The circuit board 22 includes a first surface 221 and a second surface 222 which are located on opposite sides in a thickness direction thereof. The circuit board 22 has a plurality of conductive paths (not shown), in which at least part of the conductive paths is electrically connected to the processing chip 23, and at least part of the conductive paths is electrically connected to the electronic components 24.

In the illustrated embodiment of the present disclosure, the detection unit 21 is mounted on the first surface 221 of the circuit board 22. The processing chip 23 and the plurality of electronic components 24 are mounted on the second surface 222 of the circuit board 22. Of course, in other embodiments, the detection unit 21, the processing chip 23 and the plurality of electronic components 24 can be mounted on a same side surface of the circuit board 22. The processing chip 23 is used to process signals of the gas refrigerant concentration detected by the detection unit 21, and transmit it to an external control board or process it by itself. The plurality of electronic components 24 include filter components such as capacitors, resistors and inductors, thereby amplifying and filtering the signals coming out of the detection unit 21.

Figure 8:
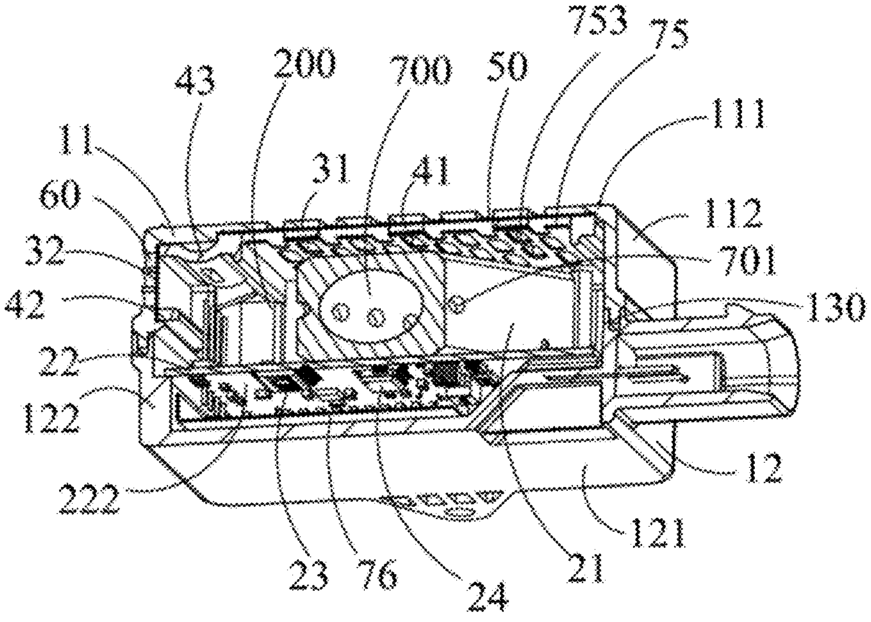
FIG. 8 is a schematic cross-sectional view of the gas detection device shown in FIG. 1.
Figure 9:
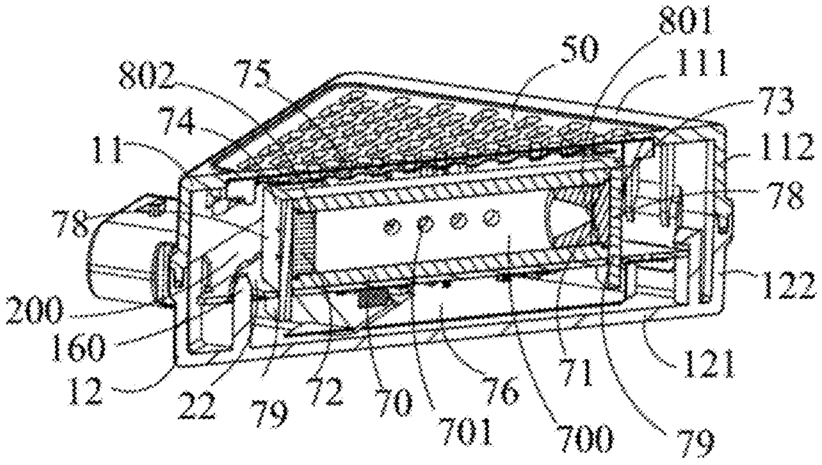
FIG. 9 is a schematic cross-sectional view of the gas detection device shown in FIG. 1 from another angle.

As shown in FIG. 2, FIG. 8 and FIG. 9, the housing 10 includes a first housing 11 and a second housing 12. The first housing 11 is located at an upper end of the second housing 12. That is, the first housing 11 and the second housing 12 can be assembled with each other in a top-bottom direction. The first housing 11 includes a first wall portion 111 and a first peripheral wall 112 vertically extending from the first wall portion 111. The second housing 12 includes a second wall portion 121 and a second peripheral wall 122 vertically extending from the second wall portion 121. The first wall portion 111 and the second wall portion 121 are respectively located on different sides in the thickness direction of the circuit board 22. The first wall portion 111 is located on a side of the first surface 221 of the circuit board 22. The second wall portion 121 is located on a side of the second surface 222 of the circuit board 22. The first peripheral wall 112 and the second peripheral wall 122 may together form a third wall portion 130 of the housing 10. In this way, the third wall portion 130 is connected between the first wall portion 111 and the second wall portion 121 in a height direction H of the gas detection device 100.

The first peripheral wall 112 and the second peripheral wall 122 may be fixedly connected or limitedly connected. The first peripheral wall 112 and the second peripheral wall 122 can be fixed through buckle connection. The buckle connection method does not require screw connection, has a simple structure, is easy to assemble, and facilitates the disassembly of the housing during maintenance.

Figure 3:
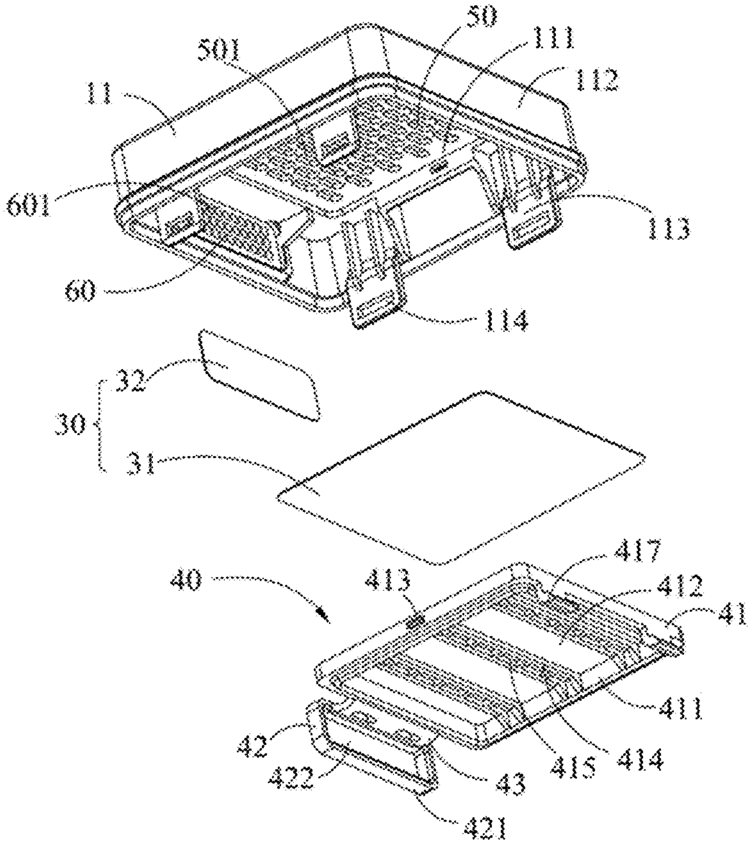
FIG. 3 is an exploded schematic view of some structural parts of the gas detection device shown in FIG. 1.
Figure 4:
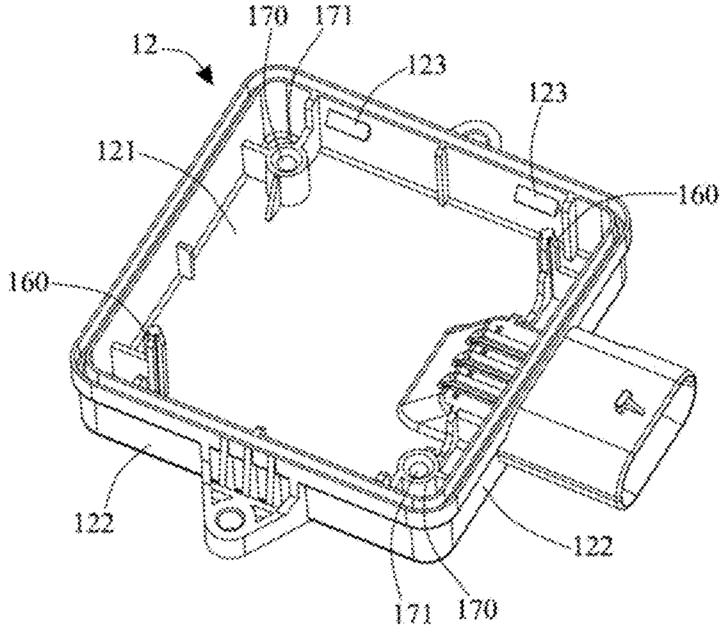
FIG. 4 is a perspective view of a first housing of the gas detection device shown in FIG. 1.

Specifically, referring to FIG. 2, FIG. 3 and FIG. 4, the first housing 11 includes a first buckle portion 113, and the second housing 12 includes a second buckle portion 123. When the first housing 11 and the second housing 12 are assembled, the first buckle portion 113 and the second buckle portion 123 are locked with each other, so that the first housing 11 and the second housing 12 are fixed together. In the illustrated embodiment, the first buckle portion 113 extends downwardly from the first peripheral wall 112. The first buckle portion 113 defines a buckle groove 114. The second buckle portion 123 is a buckle boss protruding from the second peripheral wall 122. In FIG. 4, the second buckle portion 123 protrudes toward a side of the inner cavity 200. In this way, the second buckle portion 123 can be locked into the buckle groove 114 to achieve fixation. The second buckle portion 123 is in the form of a triangular boss with a large thickness at a lower end and a small thickness at an upper end, thereby facilitating the first buckle portion 113 to slide downwardly along a slope of the second buckle portion 123 to be finally bucked together. Of course, in some other embodiments, the first buckle portion 113 and the second buckle portion 123 may exchange positions. For example, a structure similar to the second buckle portion 123 can also be provided on the first housing 11, and a structure similar to the first buckle portion 113 can be provided on the second housing 12, as long as the snap fit of the two housings can be achieved, the application is not limited to the illustrated embodiment.

Figure 12:
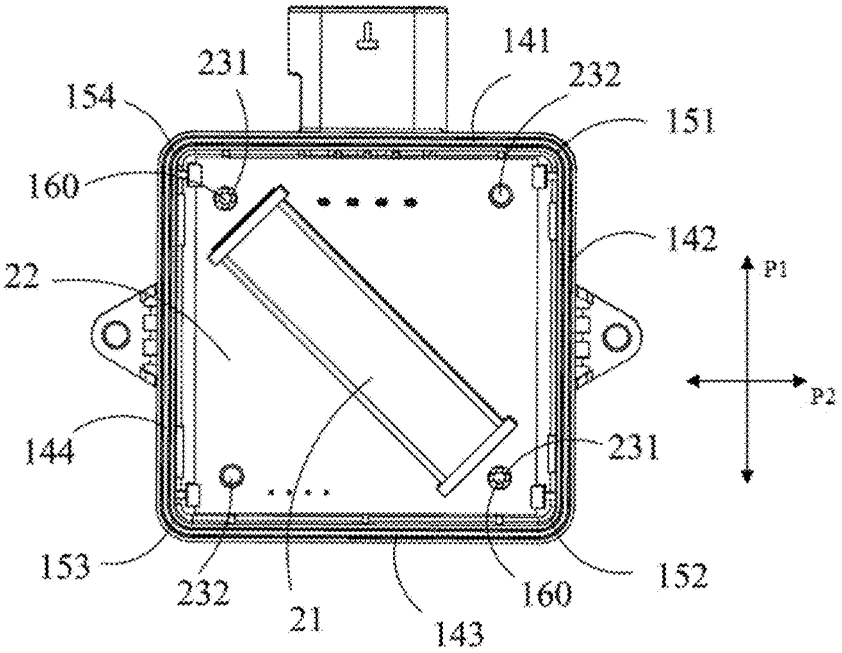
FIG. 12 is a schematic top view of some structural parts of the gas concentration detection device shown in FIG. 1.

In an embodiment of the present disclosure, both the first housing 11 and the second housing 12 are plastic parts. Referring to FIG. 12, a cross section of the second housing 12 has an outer contour of a rounded rectangle. Specifically, the second peripheral wall 122 includes a first sub-wall 141, a second sub-wall 142, a third sub-wall 143 and a fourth sub-wall 144. The first sub-wall 141 and the third sub-wall 143 are parallel. The second sub-wall 142 and the fourth sub-wall 144 are parallel. The second peripheral wall 122 further includes a first corner wall 151 connected between the first sub-wall 141 and the second sub-wall 142, a second corner wall 152 connected between the second sub-wall 142 and the third sub-wall 143, a third corner wall 153 connected between the third sub-wall 143 and the fourth sub-wall 144, and a fourth corner wall 154 connected between the fourth sub-wall 144 and the first sub-wall 141. In order to adapt to the second housing 12, a cross section of the first housing 11 also has an outer contour of a rounded rectangle. Correspondingly, the circuit board 22 is also a regular rectangular plate that matches the shape of the second housing 12.

Referring to FIG. 8, the circuit board 22 is fixed to the second housing 12. The second peripheral wall 122 circumferentially surrounds the circuit board 22. The detection unit 21 is at least partially located between the circuit board 22 and the first wall 111. The circuit board 22 has a rectangular shape. The thickness direction of the circuit board 22, a thickness direction of the first wall portion 111 and a thickness direction of the second wall portion 121 are substantially in a same direction. The four corners of the circuit board 22 are provided with two diagonally arranged first corner holes 231 and two diagonally arranged second corner holes 232, respectively.

The second housing 12 further includes two positioning posts 160 and two support posts 170 extending vertically from the second wall portion 121. The positioning posts 160 cooperate with the first corner holes 231. At least part of the positioning post 160 is located in a corresponding first corner hole 231. The positioning post 160 may have a cross-shaped cross section. An outer diameter of a top of the positioning post 160 away from the second wall 121 is smaller than an outer diameter of a bottom close to the second wall 121, so that it can be easily inserted into the corresponding first corner hole 231 of the circuit board 22. The support posts 170 cooperate with the second corner holes 232. The support post 170 defines a threaded hole 171 extending along the thickness direction of the circuit board 22. The threaded hole 171 is coaxial with a corresponding second corner hole 232. The gas detection device 100 further includes a screw 16 which is passed through the second corner hole 232 to be screw-fitted with the corresponding threaded hole 171. In this way, the circuit board 22 can be firmly installed in a corresponding cavity of the second housing 12. The positioning posts 160 and the support posts 170 cooperate to improve the assembly efficiency of the gas detection device 100. The support post 170 has a certain height, thereby leaving sufficient mounting space for the electronic components 24 mounted on the second surface 222 of the circuit board 22.

In order to realize that the target gas can be detected by the detection unit 21, the housing 10 has a first ventilation portion 50 and a second ventilation portion 60. The first ventilation portion 50 and the second ventilation portion 60 are respectively provided toward different sides of the detection unit 21. The first ventilation portion 50 and the second ventilation portion 60 are respectively located at different positions of the housing 10. On the one hand, the two ventilation portions disposed toward different sides of the detection unit 21 are helpful to expand inlet and outlet paths of the gas, ensure the gas intake volume, and improve the gas circulation efficiency. On the other hand, it can ensure that the detection unit 21 can quickly detect the target gas coming in from different positions and directions of the housing 10, thereby improving the detection sensitivity of the detection unit 21 and shortening the response time of the detection unit 21.

Figure 5:
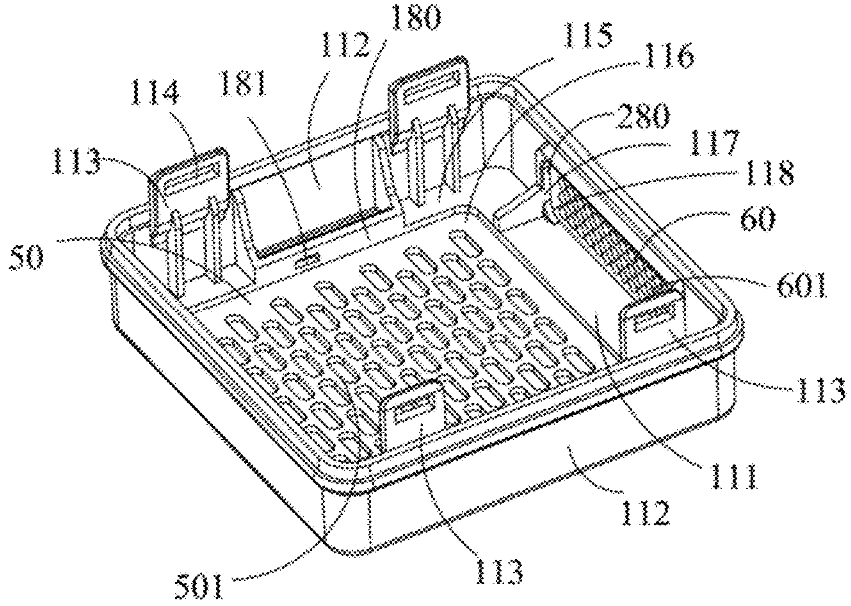
FIG. 5 is a perspective view of a second housing of the gas detection device shown in FIG. 1.

Referring to FIG. 5, the first ventilation portion 50 is located on the first wall portion 111. The second ventilation portion 60 is located on the third wall portion 130. Specifically, the second ventilation portion 60 is located on the first peripheral wall 112.

The waterproof and breathable membrane 30 of the gas detection device 100 includes a first membrane body 31 and a second membrane body 32. The first membrane body 31 and the second membrane body 32 may have an integrated structure or a separate structure. In the illustrated embodiment, the first membrane body 31 and the second membrane body 32 are two independent membrane bodies. The arrangement of the first membrane body 31 and the second membrane body 32 reduces the possibility of impurities such as moisture and dust outside the gas detection device 100 entering the inner cavity 200, so that the gas detection device 100 has better waterproof and dustproof performance. The waterproof and breathable membrane 30 may include a waterproof breathable porous material attached to a polyester fiber fabric processed through a specific process. The pore size is at the nanometer level, so that it can be waterproof, dustproof and breathable.

The first membrane body 31 covers at least a partial area of the first ventilation portion 50. The second membrane body 32 covers at least a partial area of the second ventilation portion 60. In the embodiment of the present disclosure, the first membrane body 31 is located between the first ventilation portion 50 and the inner cavity 200, and the second membrane body 32 is located between the second ventilation portion 60 and the inner cavity 200. In other words, the first membrane body 31 and the second membrane body 32 are both located inside the housing 10, so they are less susceptible to influence and damage from the external environment.

As shown in FIG. 5, the first wall portion 111 further includes a first protruding portion 115 which protrudes toward the inner cavity 200 relative to the first ventilation portion 50. The first protruding portion 115 is located around a periphery of the first ventilation portion 50. The first protruding portion 115 and the first ventilation portion 50 form a first receiving cavity 116 in which the first membrane body 31 is located. The first receiving cavity 116 is helpful for positioning the first membrane body 31 so that the first membrane body 31 is not easy to move. The third wall portion 130 further includes a second protrusion 117 protruding toward the inner cavity 200 relative to the second ventilation portion 60. The second protruding portion 117 is located around a periphery of the second ventilation portion 60. The second protruding portion 117 and the second ventilation portion 60 form a second receiving cavity 118 in which the second membrane body 32 is located. The second receiving cavity 118 is helpful for positioning the second membrane body 32 so that the second membrane body 32 is not easy to move.

Figure 6:
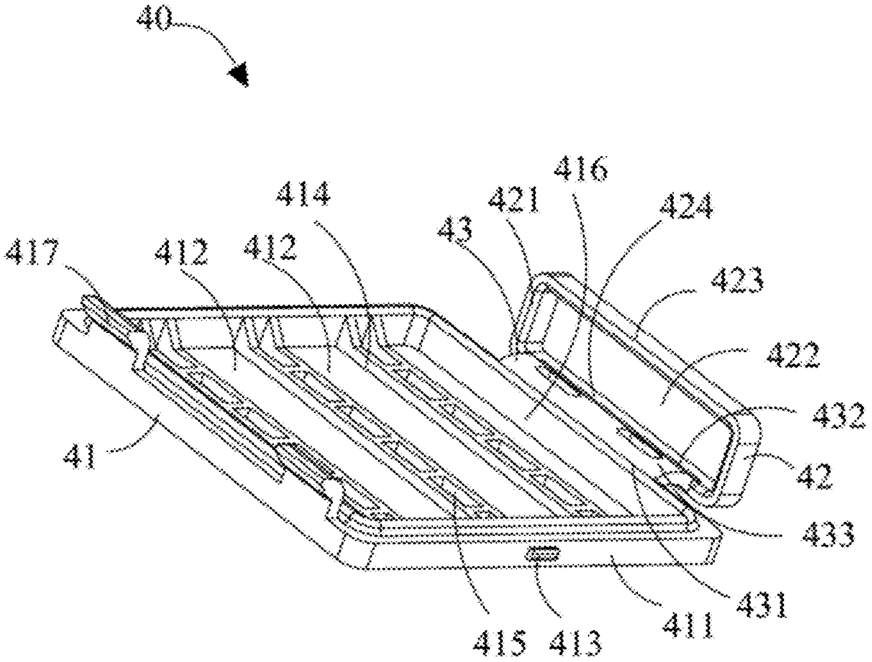
FIG. 6 is a schematic perspective structural view of a support member of the gas detection device of the present disclosure.
Figure 7:
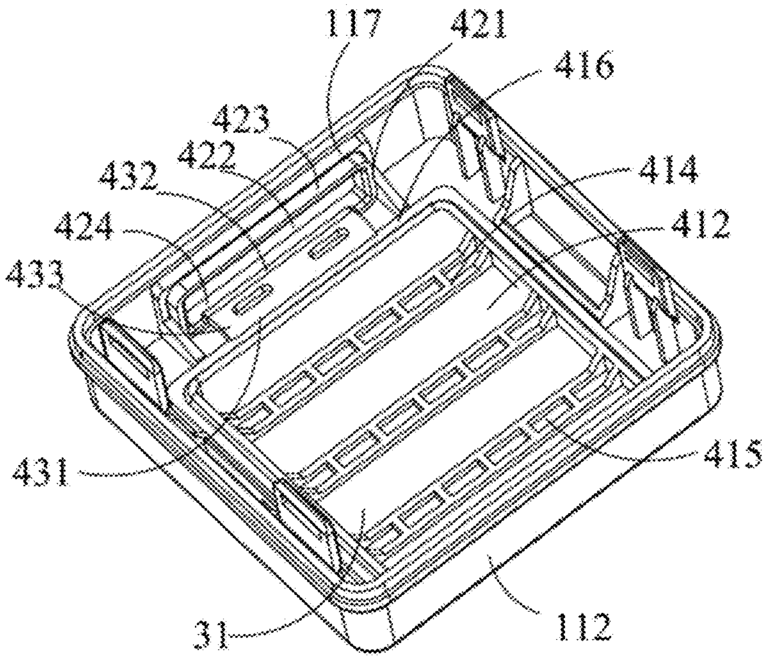
FIG. 7 is a schematic view of an assembly structure of some structural parts of the gas detection device of the present disclosure.

As shown in FIG. 6, FIG. 7 and FIG. 8, the support member 40 is limitedly or fixedly connected to the housing. The support member 40 includes a first support portion 41 and a second support portion 42. The first support portion 41 and the second support portion 42 are of an integrated structure. The support member 40 can be a plastic part with certain strength and hardness, which has low material cost and can be manufactured by low-cost manufacturing methods such as injection molding. Part of the first membrane body 31 is fixed between the first wall portion 111 and the first support portion 41. Part of the second membrane body 32 is fixed between the third wall portion 130 and the second support portion 42. Specifically, both the first support portion 41 and the second support portion 42 may be of closed annular structures. The size of the first support portion 41 may be approximately equivalent to the size of the first ventilation portion 50. The size of the second support portion 42 may be approximately equivalent to the size of the second ventilation portion 60. The support member 40 is also received in the inner cavity 200. A peripheral portion of the first membrane body 31 is sandwiched and positioned between the first ventilation portion 50 and the first support member 40. A peripheral portion of the second membrane body 32 is sandwiched and positioned between the second ventilation portion 60 and the second support member 40. Furthermore, while being sandwiched and fixed, the first membrane body 31 and the second membrane body 32 can also be disposed at corresponding positions of the housing 10 or the support member 40 through adhesive bonding so as to further enhance their fixing strength.

The first support portion 41 includes a first outer annular wall 411. The first support portion 41 further defines at least one first through groove 412 located in the first outer annular wall 411. The first through groove 412 and the first ventilation portion 50 are respectively located on different sides in a thickness direction of the first membrane body 31.

The first support portion 41 includes a locking boss 413 protruding from the first outer annular wall 411. The first protruding portion 115 includes a first inner wall 180 connected to the first ventilation portion 50. The first inner wall 180 defines a groove 181 in which the locking boss 413 is at least partially received.

The first support portion 41 further includes abutment legs 417 extending vertically from the first outer annular wall 411. An end of the abutment leg 417 protrudes outwardly. An inner side of the first peripheral wall 112 defines an abutment groove (not shown) that matches the abutment legs 417. The abutment leg 417 is at least partially located in the abutment groove, and the abutment leg 417 is in contact with the first peripheral wall 112 in the abutment groove. The abutment legs 417 and the locking boss 413 are respectively connected to different positions of the first outer annular wall 411. The abutment legs 417 and the second support portion 42 may be disposed oppositely.

The second support portion 42 includes a second outer annular wall 421. The second support portion 42 further defines at least one second through groove 422 located in the second outer annular wall 421. The second through groove 422 and the second ventilation portion 60 are respectively located on different sides in a thickness direction of the second membrane body 32. The second protruding portion 117 has a second inner wall 280 connected to the second ventilation portion 60. The second outer annular wall 421 has an outer side wall 423 away from the second through groove 422. The second inner wall 280 is attached to the outer wall 423.

Since the size of the first ventilation portion 50 is larger than the size of the second ventilation portion 60, the size of the first membrane body 31 is larger than the size of the second membrane body 32. Correspondingly, a cross-sectional area corresponding to an area surrounded by the first outer annular wall 411 is larger than a corresponding cross-sectional area of an area surrounded by the second outer annular wall 421. The contours of the first outer annular wall 411 and the second outer annular wall 421 are both rounded rectangles. Since the first ventilation portion 50 is disposed directly facing the detection unit 21, the large-area gas intake passage has high gas intake efficiency and fast detection response time.

As shown in FIG. 5, the first ventilation portion 50 defines a plurality of rows of first through holes 501. The number of first through holes 501 in each row is multiple, and the plurality of first through holes 501 are disposed at intervals. Each row of first through holes 501 is disposed along a width direction of the gas detection device 100. Two adjacent rows of first through holes 501 are disposed in a staggered manner. Such an arrangement of the plurality of first through holes 501 is beneficial to improve gas intake efficiency. The ventilation portion between two adjacent rows of first through holes 501 forms a reinforcing rib structure, which can prevent deformation or damage of the first wall portion 111 caused by opening more first through holes 501 at the first wall portion 111. Similarly, the second ventilation portion 60 defines a plurality of rows of second through holes 601. The number of second through holes 601 in each row is multiple, and the plurality of second through holes 601 are disposed at intervals. Each row of first through holes 501 is disposed along the width direction of the gas detection device 100. Two adjacent rows of second through holes 601 are arranged in alignment or offset. A cross-sectional area of the first through hole 501 is larger than a cross-sectional area of the second through hole 601. The advantage of this is that at the first peripheral wall 112 where the size space is relatively limited, the relatively small second through hole 601 will not easily deform or damage the first peripheral wall 112 and will not affect the overall strength of the housing 10, and can cooperate with the first through hole 501 to achieve cyclic gas intake and outlet. As a result, it is beneficial to improve the detection accuracy of the gas detection device 100.

In order to prevent the relatively large first support portion 41 from being easily deformed, the first support portion 41 further includes a plurality of reinforcing walls 414. Two adjacent first through grooves 412 are respectively located on different sides of the reinforcing wall 414 in the width direction. On the one hand, the reinforcing walls 414 can improve the structural strength of the first support portion 41, and on the other hand, it can further support the first membrane body 31 so that the first membrane body 31 will not fall off easily. The reinforcing wall 414 is provided with a row of third through holes 415 arranged at intervals. The size and shape of the third through hole 415 and the first through hole 501 are the same. Along a thickness direction of the reinforcing wall 414, a row of first through holes 501 and a row of third through holes 415 are arranged in alignment. With this arrangement, the reinforcing wall 414 has less impact on gas blocking, which is beneficial to improve the detection accuracy of the gas detection device 100.

As shown in FIG. 6, the support member 40 further includes a third support portion 43. The first support portion 41, the second support portion 42 and the third support portion 43 are of an integrated structure. The support member 40 can be integrally injection molded. The third support portion 43 has a first connecting end 431, a second connecting end 432 and a main body portion 433 located between the first connecting end 431 and the second connecting end 432. The first connecting end 431 is connected to the first outer annular wall 411. The second connecting end 432 is connected to the second outer annular wall 421. At least part of the main body portion 433 is opposite to the first protruding portion 115. The main body portion 433 is curved. A middle position of the main body portion 433 is further away from the first protruding portion 115 than both the first connecting end 431 and the second connecting end 432. Since the first support portion 41 and the second support portion 42 are in a substantially perpendicular relationship, the curved main body portion 433 provided on the third support portion 43 has a certain degree of toughness and a certain range of deformation. This is beneficial to improve the overall strength of the support member 40, so that the support member 40 is not easily broken.

For the first support portion 41, the first outer annular wall 411 includes a first connecting wall 416. For the second support member 40, the second outer annular wall 421 includes a second connecting wall 424. The first connecting end 431 is connected to the first connecting wall 416. Two sides of the first connecting wall 416 along its length direction both extend beyond the first connecting end 431. The second connecting end 432 is connected to the second connecting wall 424. Two sides of the second connecting wall 424 along its length direction both extend beyond the second connecting end 432. Therefore, the overall size of the third support portion 43 is smaller, it does not occupy too much space in the inner cavity 200, and it is also beneficial to the lightweight design of the gas detection device 100.

Figure 10:
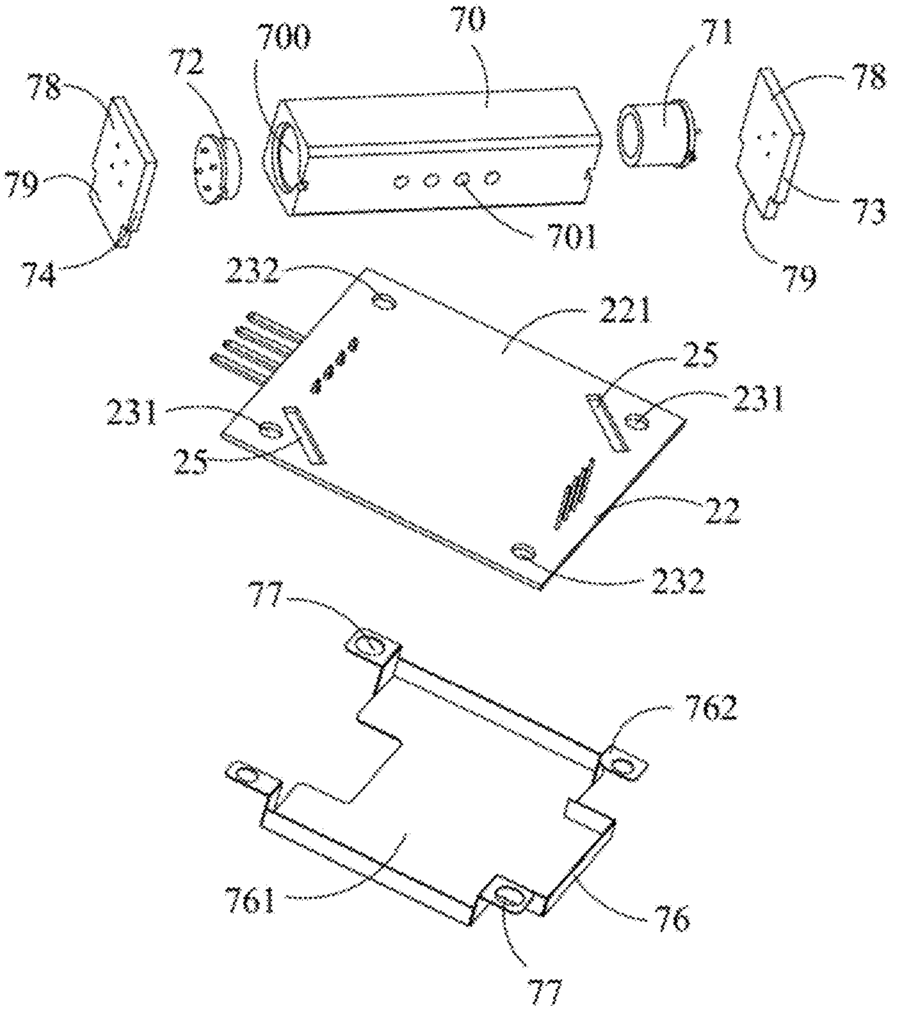
FIG. 10 is an exploded schematic view of some structural parts of the gas detection device shown in FIG. 9.
Figure 15:
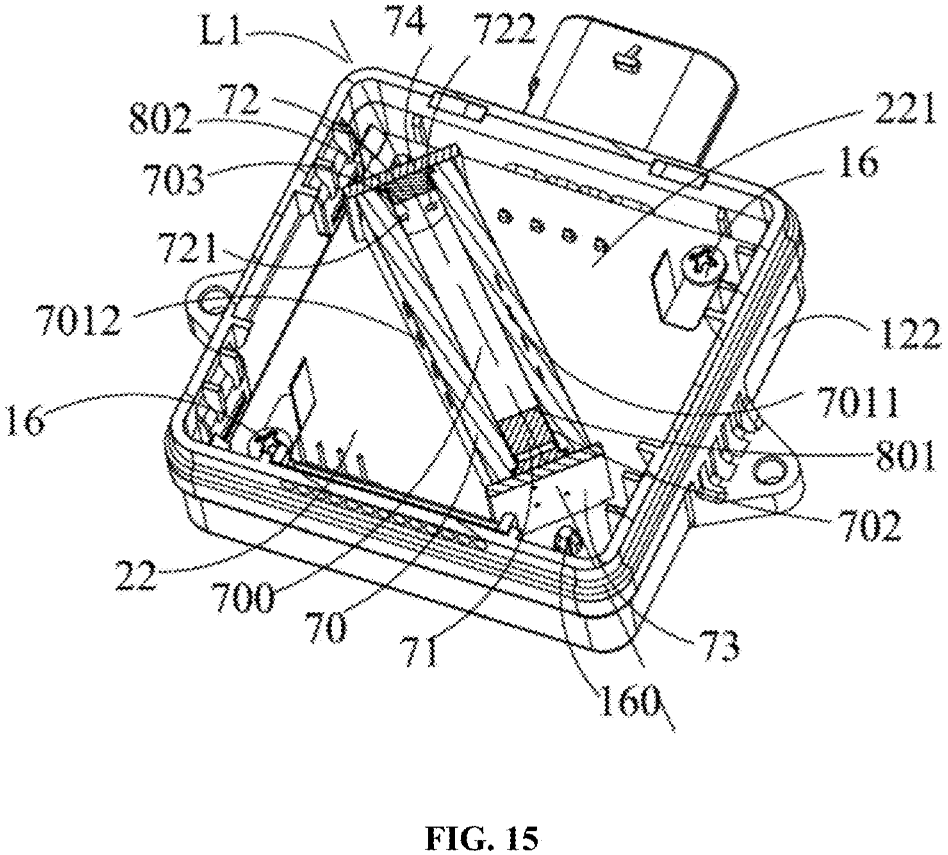
FIG. 15 is a schematic cross-sectional view of the gas detection device shown in FIG. 1 from another angle.
Figure 16:
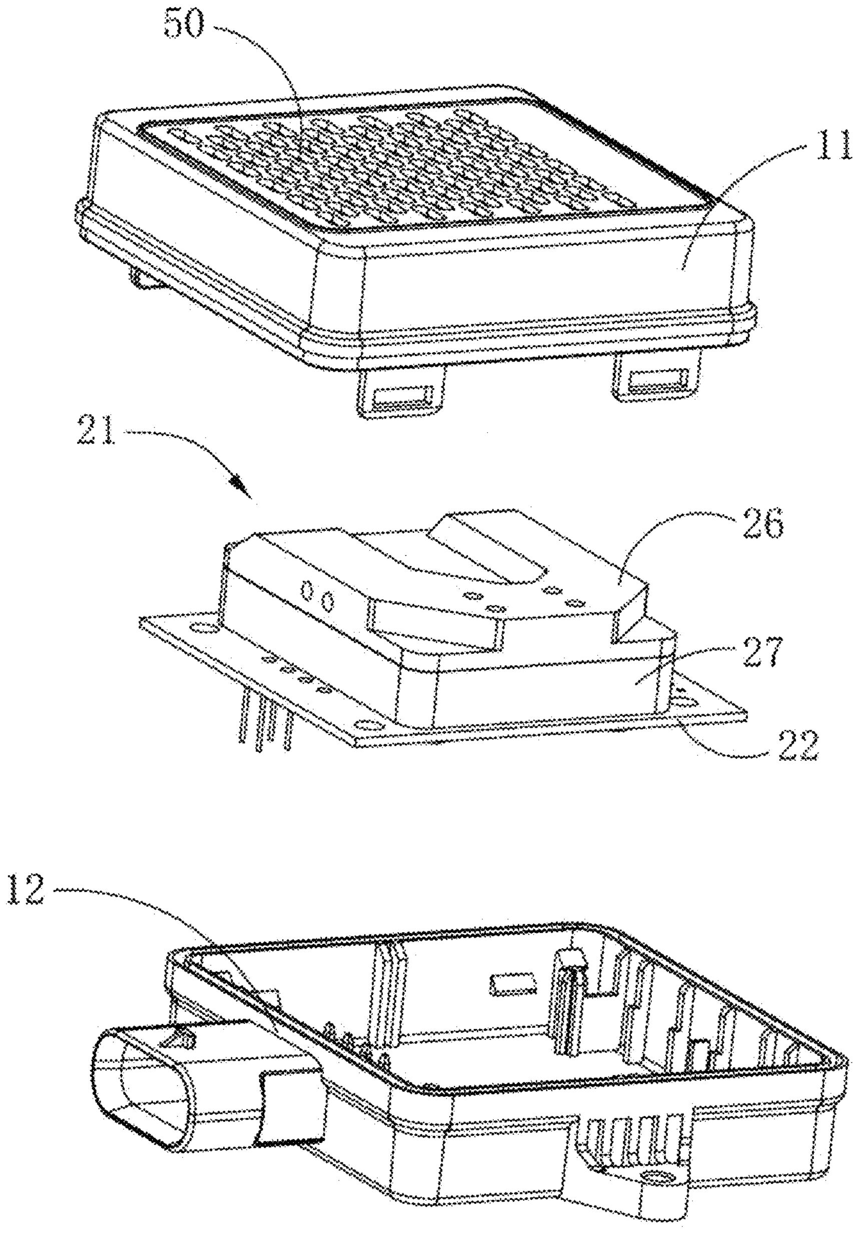
FIG. 16 is an exploded schematic structural view of the gas detection device according to another embodiment of the present disclosure.

As shown in FIG. 10 and FIG. 15, the present disclosure further provides a detection unit 21 that adopts the optical detection principle. The detection unit 21 includes a detection housing 70, a light source module 71 and a detection probe 72. The detection housing 70 may be an elongated straight-cylinder housing. A cross section of the detection housing 70 may be rectangular, circular or other shapes. In the embodiment of the present disclosure, the detection housing 70 with a cross-sectional outer contour of a rounded rectangle is used for illustration. In other embodiments, a non-through-beam reflective gas chamber can also be constructed in the detection housing 70, that is, the light emitted by the light source can reach the detection probe after being reflected in a plurality of places. In the following embodiments of the present disclosure, a straight-cylindrical gas chamber constructed in the detection housing 70 is mainly used as an example for description.

The light source module 71 is disposed at one end of the detection housing 70 in the length direction thereof to emit light. The detection probe 72 is disposed at another end of the detection housing 70 in the length direction thereof to receive the light. The light source module 71 can be selected as an infrared light source. Correspondingly, the detection probe 72 is an infrared detection probe. The light source module 71 and the detection probe 72 are arranged almost coaxially. The detection housing 70 is straight-cylindrical. The infrared light emitted by the light source module 71 is incident on the detection probe 72 almost along a straight direction. The light source module 71 and the detection probe 72 are electrically connected to the circuit board 22, respectively. The detection unit 21 further defines a gas chamber 700. The detection housing 70 is provided on a periphery of the gas chamber 700. The detection housing 70 defines a fitting hole 701 which extends through an inner surface and an outer surface of the detection housing 70. The fitting hole 701 is in communication with the first ventilation portion 50, the fitting hole 701 is in communication with the second ventilation portion 60, and the fitting hole 701 is in communication with the gas chamber 700.

The principle of the above detection unit 21 is explained as follows: different gases have different absorption spectra due to differences in their molecular structures, concentrations and energy distributions. When detecting a target gas, the absorption of light of characteristic wavelength by the target gas complies with Lambert-Beer's law. Taking the light source module 71 as an infrared light source as an example, when the light source module 71 emits an infrared beam through the gas chamber 700 and reaches the detection probe 72, the target gas will absorb the infrared ray of a specific wavelength. That is to say, the target gas leaked from outside will enter the inner cavity 200 through the ventilation portion of the housing 10, the waterproof and breathable membrane 30 and other structures, and then enter the gas chamber 700 through the fitting hole 701 on the detection housing 70. The target gas entering the gas chamber 700 will absorb the infrared light of specific wavelengths. In this way, the detection probe 72 can calculate information such as the concentration of the target gas by detecting changes in light intensity.

The detection housing 70 may be made of aluminum. In practice, in order to enhance the transmission of light in the gas chamber 700 and reduce light loss, the inner surface of the detection housing 70 can be polished or gold-plated. Of course, the material of the detection housing 70 can also be ABS plastic, and its inner surface can also be plated with gold to enhance the light emission and reflection effects. In addition, the light source module 71 and the detection probe 72 have a through-beam structure. In order to make the light from the light source module 71 incident on the detection probe 72 in as linear a manner as possible, the light source module 71 can add a reflective cup near its light-emitting position. The reflective cup can be in a shape of a trumpet, with one end narrowing and the other end expanding. The reflective cup is nested in the gas chamber 700. An outer peripheral side of the reflective cup is attached to or abuts against the inner surface of the detection housing 70. A light-emitting element can be disposed at the narrowing end of the reflective cup. As a type of reflective device, the reflective cup can use limited light energy to control the illumination distance and illumination area of the main light spot of the light-emitting element through light reflection.

Figure 13:
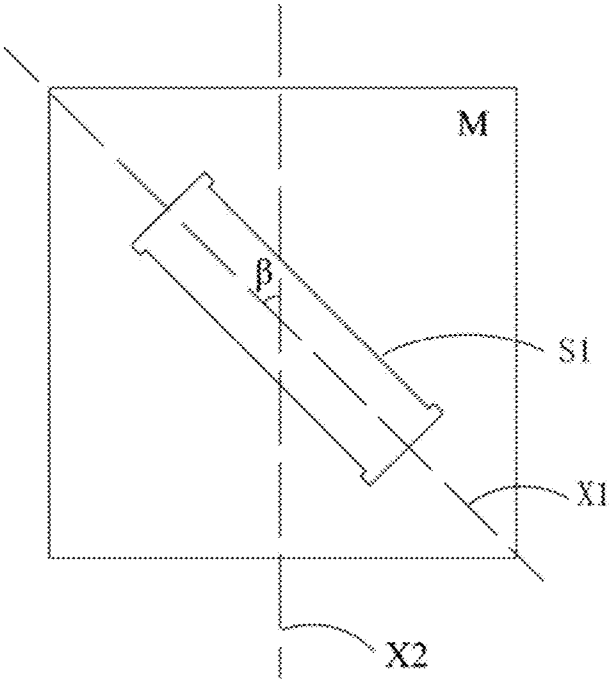
FIG. 13 is a schematic view of a relationship between a first straight line and a second straight line shown in FIG. 12.

In order to improve the detection accuracy of the gas detection device 100, the straight-cylindrical detection housing 70 needs to ensure a certain length. In order to achieve the length increase of the detection housing 70 in a restricted space, in the present disclosure, with reference to FIG. 13, a first straight line X1 and a second straight line X2 are defined on a plane M perpendicular to the height direction H of the gas detection device 100. The detection housing 70 has a first projection S1 on this plane. The first straight line X1 extends along a length direction of the first projection S1. The second straight line X2 extends along the width direction or the length direction of the gas detection device 100. Referring to FIG. 12, the width direction of the gas detection device 100 can be illustrated with reference to the P2 direction. The length direction of the gas detection device 100 can be illustrated with reference to the P1 direction. In FIG. 13, the second straight line X2 has the same extension direction as a center line in the width direction of the gas detection device 100. The first straight line X1 is inclined at an acute angle β with respect to the second straight line X2, which is beneficial to enlarge the mounting space of the detection unit 21. Correspondingly, it is also beneficial to extend the distance between the light source module 71 and the detection probe 72. In this way, through a longer optical path, the gas can absorb the infrared light more fully, which is beneficial to improve the detection accuracy of the gas detection device 100.

In the embodiment of the present disclosure, in the length direction of the detection housing 70, the detection unit 21 is located between the first corner wall 151 and the third corner wall 153, or the detection unit 21 is located between the second corner wall 152 and the fourth corner wall 154. The diagonal direction of the two first corner holes 231 is in the same direction as the length direction of the detection housing 70, and the detection unit 21 is located between the two first corner holes 231. This will not easily interfere with the positioning posts 160.

Figure 14:
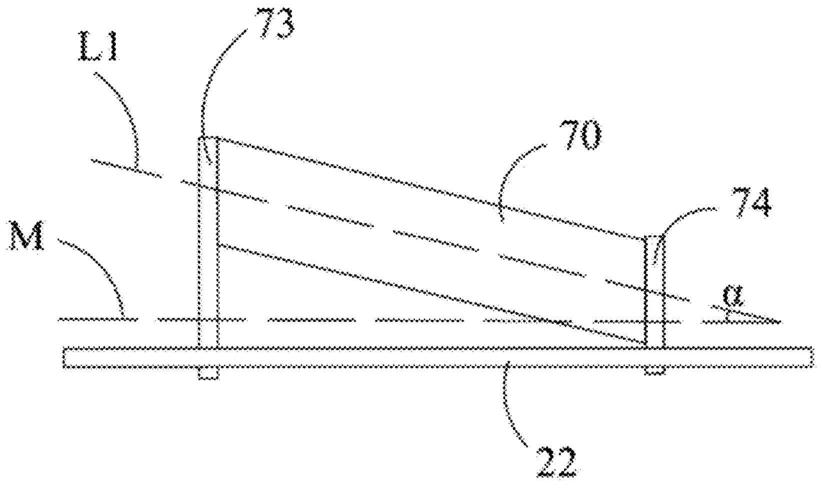
FIG. 14 is a schematic view of a relationship between a center line of a detection housing and a plane perpendicular to a height direction of the gas detection device in other embodiments of the gas detection device of the present disclosure.

In the embodiment of the present disclosure, a bottom end surface of the detection housing 70 is placed on the first surface 221 of the circuit board 22. In some other embodiments, in order to further expand the mounting space of the detection unit 21, as shown in FIG. 14, the center line L1 of the detection housing 70 intersects and is not perpendicular to the plane M perpendicular to the height direction H of the gas detection device 100, and the angle thereof is α. One side of the bottom end surface of the detection housing 70 is in contact with the first surface 221 of the circuit board 22, and the other side is raised and does not be in contact with the circuit board 22. This is beneficial to utilize the space in the height direction H of the housing to further expand the mounting space of the detection unit 21, so that the detection housing 70 can be longer. Furthermore, some electronic components 24 can also be installed between part of the bottom end surface of the detection housing 70 and the circuit board 22, which is more beneficial to improve the utilization rate of the circuit board 22.

The detection unit 21 further includes a first adapter board 73 and a second adapter board 74. Both the first adapter board 73 and the second adapter board 74 have a mounting body 78 and an insertion portion 79. The circuit board 22 defines insertion holes 25 corresponding to the two insertion portions 79, respectively. The insertion portion 79 is at least partially received in the insertion hole 25. The main body portion 433 is located between the first wall portion 111 and the circuit board 22. Pins of the light source module 71 are welded to the mounting body 78 of the first adapter board 73. Pins of the detection probe 72 are welded to the mounting body 78 of the second adapter board 74. Both the first adapter board 73 and the second adapter board 74 are welded to the circuit board 22. Specifically, the first adapter board 73 and the second adapter board 74 may each be an adapter circuit board 22 that implements an electrical connection function. Taking the cooperation between the first adapter board 73 and the light source module 71 as an example, the pins of the light source module 71 do not need to be bent, thereby avoiding the risk of damage or breakage. The pins of the light source module 71 are first welded to the first adapter board 73, and then are electrically connected to the circuit board 22 through the first adapter board 73. The mounting body of the first adapter board 73 may define pin holes for insertion of the pins of the light source module 71. The pins of the light source module 71 pass through the pin holes from one side of the first adapter board 73 and are partially exposed on the other side of the first adapter board 73. Then, the pins of the light source module 71 are soldered to the first adapter board 73 by soldering. The first adapter board 73 is also welded to the circuit board 22 through a plug-in board connection. The second adapter board 74 and the detection probe 72 cooperate in the same manner, which will not be described in detail here.

Referring to FIG. 9 and FIG. 15, two ends of the detection housing 70 in the length direction thereof have a first mounting area 702 and a second mounting area 703, respectively. The light source module 71 is at least partially located in the first mounting area 702. An outer peripheral wall of the light source module 71 is bonded and fixed to an inner peripheral wall of the detection housing 70 in the first mounting area 702. The detection probe 72 is at least partially located in the second mounting area 703. An outer peripheral wall of the detection probe 72 is bonded and fixed to the inner peripheral wall of the detection housing 70 in the second mounting area 703. The first adapter board 73 and the second adapter board 74 are in contact with the end surfaces on two sides of the detection housing 70 in the length direction, respectively. The light source module 71 has a light emitting side 801. The detection probe 72 has a light receiving side 802. The light emitting side 801 is disposed facing the light receiving side 802. The gas chamber 700 is located between the light emitting side 801 and the light receiving side 802.

The light source module 71 is a MEMS type blackbody light source. The wave peak range of the infrared light emitted by the light source module 71 is 1 μm to 16 μm. The detection probe 72 is a pyroelectric-type or thermopile-type detection probe. The detection probe 72 includes a detection channel 721 and a reference channel 722 which are arranged independently of each other. Both the detection channel 721 and the reference channel 722 contain matched narrow-band filters and pyroelectric chips/thermopile chips. With this arrangement, the detection channel 721 and the reference channel 722 of the detection probe 72 will be affected by temperature, humidity, cross-interference between different gases, etc. When implementing concentration calculation, the ratio or difference of the two voltage output signals can be used to improve the accuracy of detecting the gas concentration by the detection channel 721. Of course, in some application scenarios that do not require high detection accuracy, the detection probe 72 may only have the detection channel 721 without the reference channel 722, which is beneficial to save costs. For example, in order to detect the concentration of the refrigerant R32 gas, and the main gas infrared absorption peak of R32 is at 9 μm, the reference channel 722 can use a filter with a wavelength that is not absorbed by the target gas. Therefore, the infrared light intensity received by the reference channel 722 and the detection channel 721 may be inconsistent. The weak electrical signals generated by the two will also be different. After being filtered by the analog amplifier circuit on the circuit board 22, they are input to the processing chip 23 on the circuit board 22. The processing chip 23 can calculate the concentration of R32 refrigerant gas. The advantage of using a dual-channel detection probe 72 is that interference can be eliminated by comparing the two, and a more accurate concentration value can be obtained. The gas chamber 700 can be a hollow cavity or a cavity arranged with a lens structure, which can further concentrate light and reduce light loss. The light source module 71 and the detection probe 72 are both in T039 package.

Referring to FIG. 15, the fitting holes 701 include a row of first fitting holes 7011 and a row of second fitting holes 7012. The number of the first fitting holes 7011 and the number of the second fitting holes 7012 are multiple. The first fitting holes 7011 and the second fitting holes 7012 are disposed symmetrically with respect to the center line L1 of the detection housing 70. In this way, it is beneficial to the entry and exit of gas, and improves the sensitivity and stability of the detection unit 21, thereby meeting the needs in the field of high-precision gas concentration detection.

Figure 11:
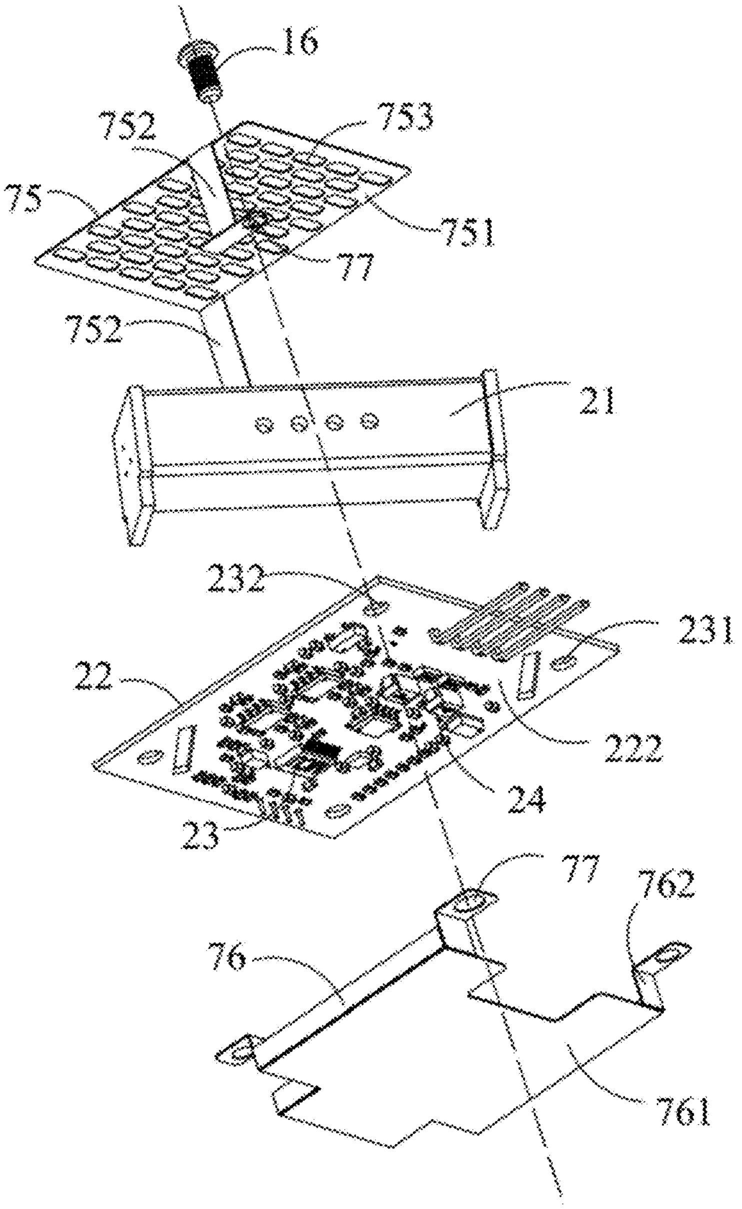
FIG. 11 is an exploded schematic view of another some structural parts of the gas detection device shown in FIG. 9.

In order for the gas detection device 100 to have a certain electromagnetic shielding function, as shown in FIG. 11, the gas detection device 100 further includes a first metal shielding case 75, a second metal shielding case 76 and a plurality of electronic components 24. The plurality of electronic components 24 and the detection unit 21 are mounted on different sides of the circuit board 22, respectively, in the thickness direction thereof. The detection unit 21 is mounted on the first surface 221 of the circuit board 22. The plurality of electronic components 24 are mounted on the second surface 222 of the circuit board 22.

The first metal shielding case 75 includes a first plate body 751 and first support legs 752. The second metal shielding case 76 includes a second plate body 761 and second support legs 762. The first plate body 751 is mounted on a side of the detection unit 21 away from the circuit board 22, and the second plate body 761 is mounted on a side of the plurality of electronic components 24 away from the circuit board 22. That is, the first plate body 751 is located on a side of the first surface 221, and the second plate body 761 is located on a side of the second surface 222. The first support legs 752 extend from the first plate body 751 toward the circuit board 22. The second support legs 762 extend from the second plate body 761 toward the circuit board 22. The first plate body 751 defines a plurality of fourth through holes 753. The fourth through hole 753 may be aligned with the through holes of the first ventilation portion 50, so that the gas can more easily reach the detection unit 21 and be less likely to be blocked by the first plate body 751.

Each of the first support legs 752 and the second support legs 762 defines a through hole 77. The through hole 77 of the first support leg 752, the through hole 77 of the second support leg 762, the threaded hole 171 and the second corner hole 232 are aligned along the thickness direction of the circuit board 22. The screw 16 passes through the through hole 77 of the first support leg 752, the through hole 77 of the second support leg 762 and the second corner hole 232 and is screw-fitted with the threaded hole 171. The first support leg 752 and the second support leg 762 are both electrically connected to a ground terminal of the circuit board 22.

Through the two electromagnetic shielding cases, the circuit board assembly 20 can be effectively protected by electromagnetic shielding. Accordingly, it is more beneficial to expand the application environment of the gas detection device 100 and prevent external electromagnetic signals from interfering with the detection of the target gas by the gas detection device 100.

Figure 17:
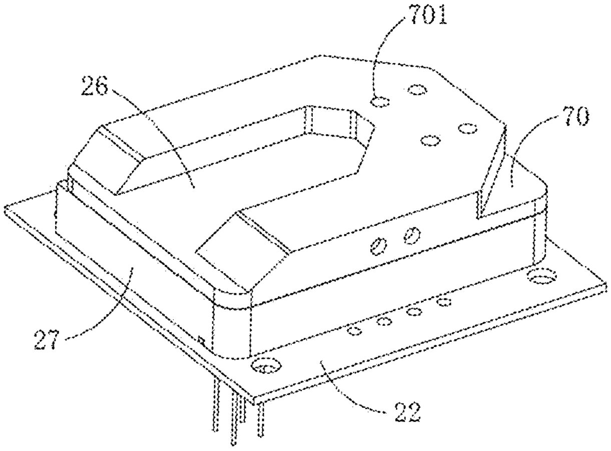
FIG. 17 is a schematic structural view of a detection unit provided by an embodiment of the present disclosure.

In another embodiment of the present disclosure, as shown in FIG. 16 to FIG. 19, the detection housing 70 defines a gas chamber 700 that transmits light. The detection housing 70 includes a first body 26 and a second body 27. The gas chamber 700 is located between the first body 26 and the second body 27. In FIG. 17, the first body 26 and the second body 27 are assembled together in the top-bottom direction, in which an upper body is the first body 26 and a lower body is the second body 27.

Figure 18:
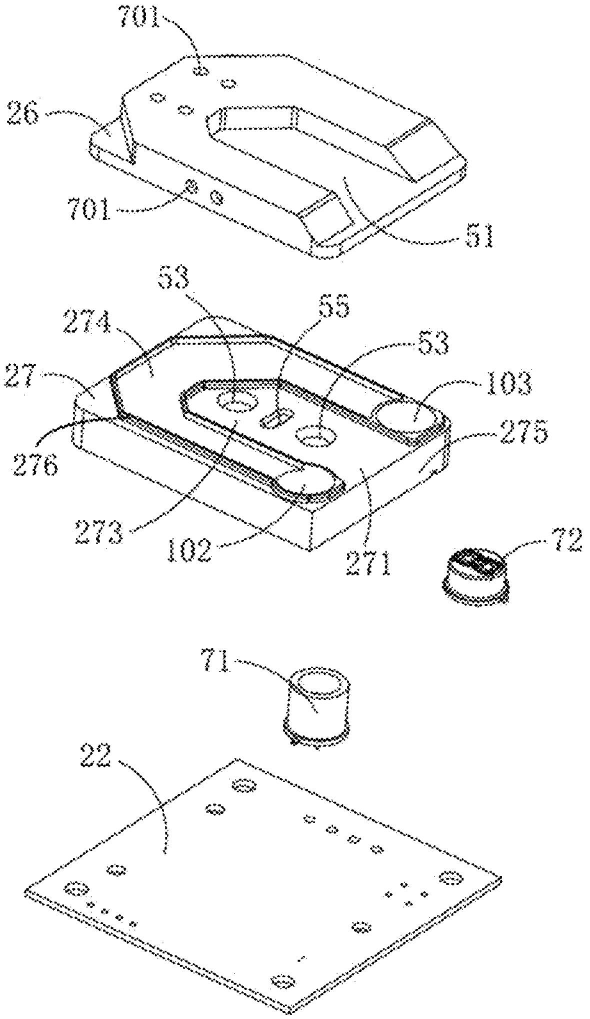
FIG. 18 is an exploded schematic structural view of the detection unit provided by an embodiment of the present disclosure.
Figure 22:
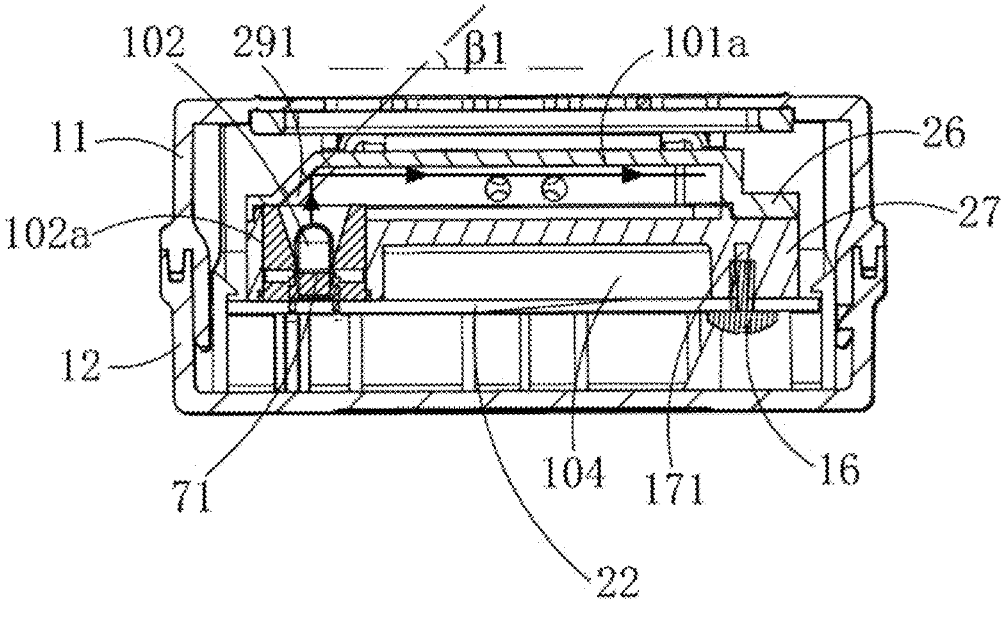
FIG. 22 is a schematic cross-sectional structural view of a side of the detection unit provided with a light source module according to an embodiment of the present disclosure.
Figure 23:
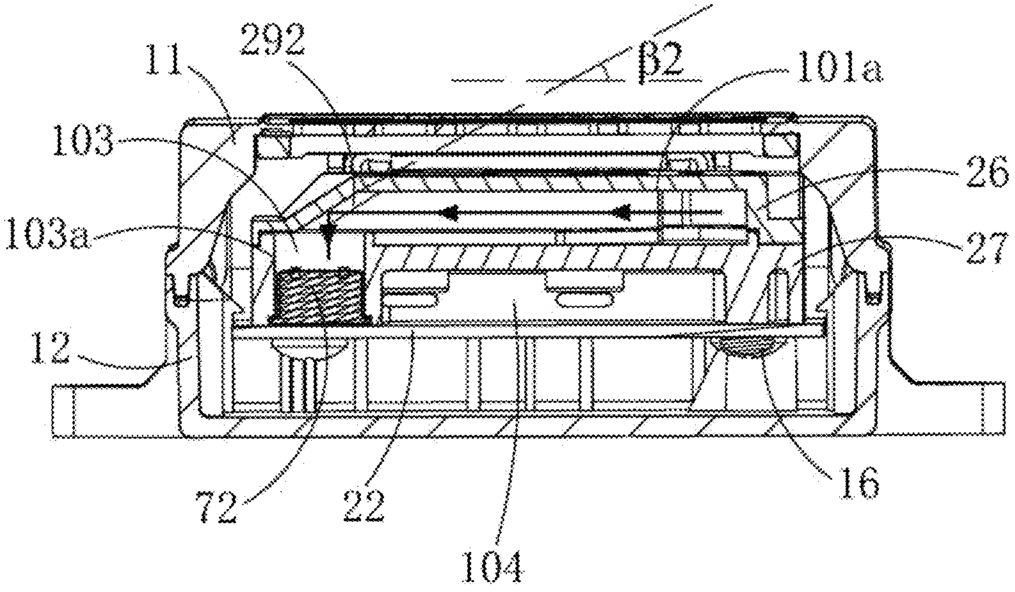
FIG. 23 is a schematic cross-sectional structural view of a side of the detection unit provided with a detection probe provided by an embodiment of the present disclosure.

Referring to FIG. 18, FIG. 22 and FIG. 23, the second body 27 defines a first cavity 102 and a second cavity 103 which are disposed at intervals. The light source module 71 is at least partially located in the first cavity 102. The detection probe 72 is at least partially located in the second cavity 103. The second body 27 has a first wall **102*a* forming the first cavity 102 and a second wall 103*a* forming the second cavity 103. The detection housing 70 has a third wall 101*a* forming the gas chamber 700. Both the first wall 102*a* and the second wall 103*a* are connected to the third wall 101*a*. Therefore, the first cavity 102, the second cavity 103 and the gas chamber 700 are in a communicated state. The first body 26 defines a plurality of fitting holes 701 which are in communication with the gas chamber 700. In this way, the gas entering the inner cavity of the housing 10 can enter the gas chamber 700 through the fitting holes 701 on the first body 26**.

The third wall 101*a* includes a plurality of reflective surfaces 29 for transmitting light. The light source module 71 faces at least one reflective surface 29. The detection probe 72 faces at least one reflective surface 29. The reflective surfaces 29 faced by the light source module 71 and the detection probe 72 may be the same reflective surface 29 or different reflective surfaces 29. When the number of reflective surfaces 29 is multiple, the light emitted by the light source module 71 can be finally transmitted to the detection probe 72 after being reflected a plurality of times by the reflective surfaces 29. The optical path structure formed by the plurality of reflections of the optical path greatly increases the path length of light transmission, which is beneficial to enhance the light absorption effect of the gas.

Furthermore, the detection housing 70 defines a third cavity 104 which is located between the second body 27 and the circuit board 22. The detection unit 21 further includes a plurality of electronic components mounted on the circuit board 22, and at least some of the electronic components are received in the third cavity 104. In this way, a board space of the circuit board 22 can be fully utilized, which is beneficial to miniaturization of the gas detection device. The circuit board 22 and the second body 27 can be fastened by screws 16. Specifically, the second body 27 may define a threaded hole 171. The threaded hole 171 is recessed from a side of the second body 27 close to the circuit board 22 toward a direction away from the circuit board 22, so that the screw 16 passes through an opening of the circuit board 22 and is finally tightened in the threaded hole 171. Of course, there are many ways to fix the circuit board 22 and the second body 27, and the present disclosure does not impose too many restrictions on this.

Figure 19:
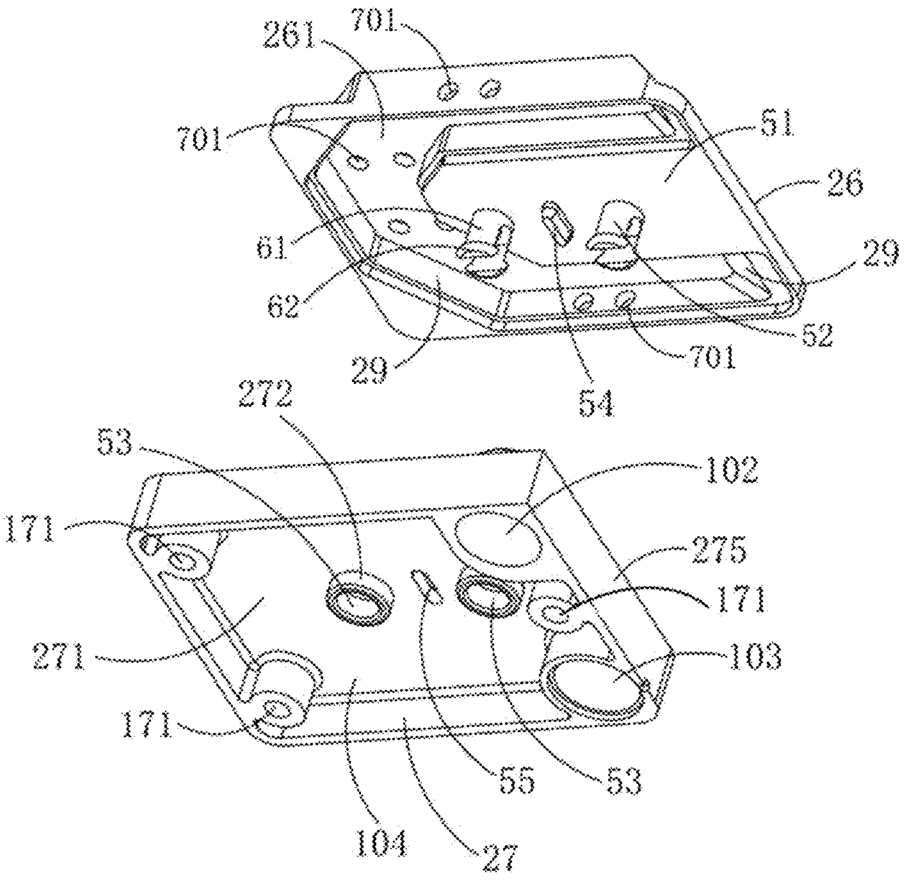
FIG. 19 is an exploded schematic structural view of a partial structure of the detection unit provided by an embodiment of the present disclosure from another perspective.
Figure 20:
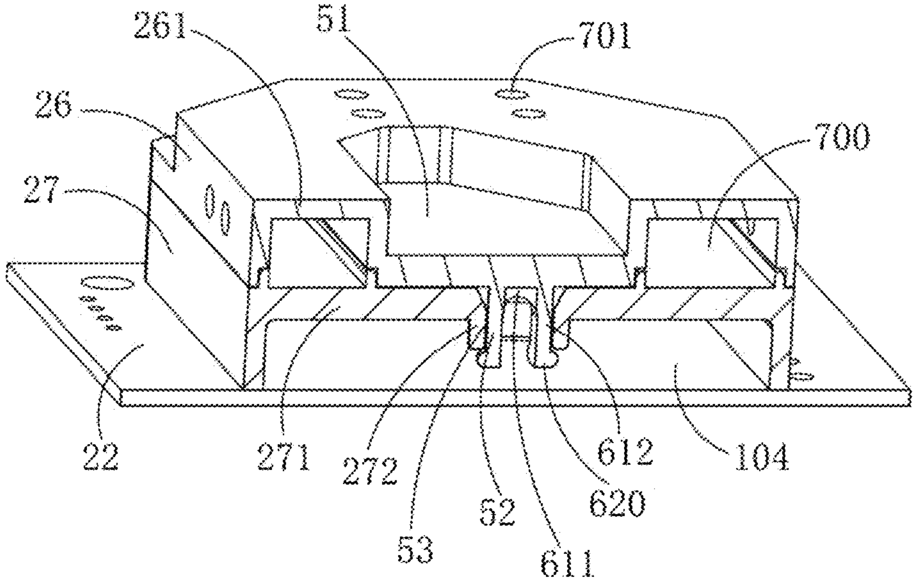
FIG. 20 is a schematic cross-sectional structural view of the detection unit provided by an embodiment of the present disclosure.

Referring to FIG. 19 and FIG. 20, the first body 26 includes a first mounting portion 51 and a protruding portion 52. The second main body 27 includes a through portion 53. The protruding portion 52 includes a first sub-portion 61 and a second sub-portion 62 which extend from the first mounting portion 51 toward the second body 27. The second sub-portion 62 is further away from the first mounting portion 51 than the first sub-portion 61. At least part of the first sub-portion 61 is located in the through portion 53. The second sub-portion 62 is located outside the through portion 53, and the second sub-portion 62 is in contact with a main structure of the second main body 27 located at a periphery of the through portion 53. The circuit board 22 is located on one side of the through portion 53 in an axial direction, and the first mounting portion 51 is located on another side of the through portion 53 in the axial direction. The second main body 27 is limited between the second sub-portion 62 and the first mounting portion 51. In this way, the first body 26 and the second body 27 can be limited and fixed through snap connection. Of course, the first mounting portion 51 and the protruding portion 52 can also be located on the second body 27. The through portion 53 is provided on the first body 26. As long as the two main bodies can be limited and fixed through the above structure, the present disclosure does not limit this.

In one embodiment of the present disclosure, two through portions 53 and two protruding portions 52 are provided. Each protruding portion 52 is matched with a corresponding through portion 53. The first body 26 further includes a positioning rod 54 which extends from the first mounting portion 51 in a direction close to the second body 27. A length of the positioning rod 54 is shorter than a length of the protruding portion 52. The positioning rod 54 is located between the two protrusion portions 52. The second body 27 further defines positioning holes 55. At least part of the positioning rod 54 is received in the positioning hole 55. The first body 26 and the second body 27 can be further firmly fixed through the positioning rod 54 and the positioning hole 55. The first body 26 and the second body 27 are not easily dislocated and moved when subjected to external force.

Figure 21:
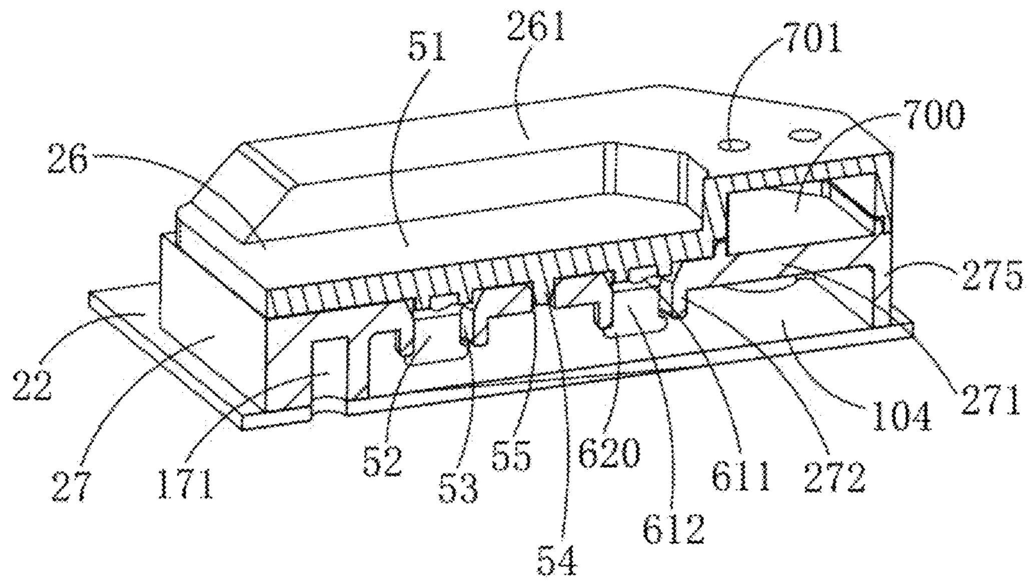
FIG. 21 is a schematic cross-sectional structural view of the detection unit provided by an embodiment of the present disclosure from another perspective.

Referring to FIG. 20 and FIG. 21, the first sub-portion 61 includes a root portion 611 and a middle portion 612. The root portion 611 is connected between the middle portion 612 and the first mounting portion 51. The number of the middle portions 612 is two, and the two middle portions 612 are spaced apart from each other and arranged oppositely. An outer peripheral surface of the middle portion 612 is in contact with at least a partial area of an inner surface of the second mounting portion 125 forming the through portion 53.

The second sub-portion 62 includes two end portions 620. One end portion 620 is connected to one middle portion 612, and the other end portion 620 is connected to the other middle portion 612. The end portions 620 protrude relative to the middle portion 612 in a direction away from the axis of the through portion 53. A distance between an outermost side of one end portion 620 in a protruding direction and an outermost side of the other end portion 620 in the protruding direction is greater than an inner diameter of the through portion 53. With this arrangement, when assembling the first body 26 and the second body 27, external force can be used to bring the two end portions 620 closer to each other so as to pass through the through portion 53. After passing through, the two end portions 620 are outwardly expanded away from each other, so that the outer peripheral surface of the middle portion 612 abuts against the inner surface of the through portion 53. The two end portions 620 are in contact with the housing structure of the second body 27 located at the periphery of the through portion 53, so that the two end portions 620 will not easily come out of the through portion 53. In this way, the first body 26 and the second body 27 can be fixed without relying on components such as screws, but can rely on the cooperation of their own housing structures to achieve fastening.

In order to facilitate the transmission of light, referring to FIG. 20, the first body 26 further includes a recessed portion 261. The recessed portion 261 is recessed from the first mounting portion 51 in a direction away from the second body 27. The second main body 27 includes a transverse wall portion 271 and a vertical wall portion 272. The transverse wall portion 271 includes a second mounting portion 273 and a fitting portion 274. The first mounting portion 51 and the second mounting portion 273 face each other at least partially. The recessed portion 261 and the fitting portion 274 face each other at least in a partial area. The gas chamber 700 is located between the recessed portion 261 and the fitting portion 274. The second mounting portion 273 and the fitting portion 274 may be separated by a partition plate 276. The partition plate 276 extends from the transverse wall portion 271 in a direction close to the first body 26. Correspondingly, the first body 26 may be provided with a groove that matches the partition plate 276. In this way, the first body 26 and the second body 27 can achieve certain positioning. The partition plate 276 can also reduce the leakage of light in the gas chamber 700.

The vertical wall portion 272 extends from the second mounting portion 273 in a direction away from the first body 26. The through portion 53 extends through the second mounting portion 273 and the vertical wall portion 272. The thickness of the second body 27 can be reduced to a certain extent through the mutually matched transverse wall portion 271 and vertical wall portion 272. Moreover, the transverse wall portion 271 and the vertical wall portion 272 are also beneficial to extend the length of the through portion 53 in the axial direction, and improve the stability of the cooperation between the first body 26 and the second body 27.

Figure 24:
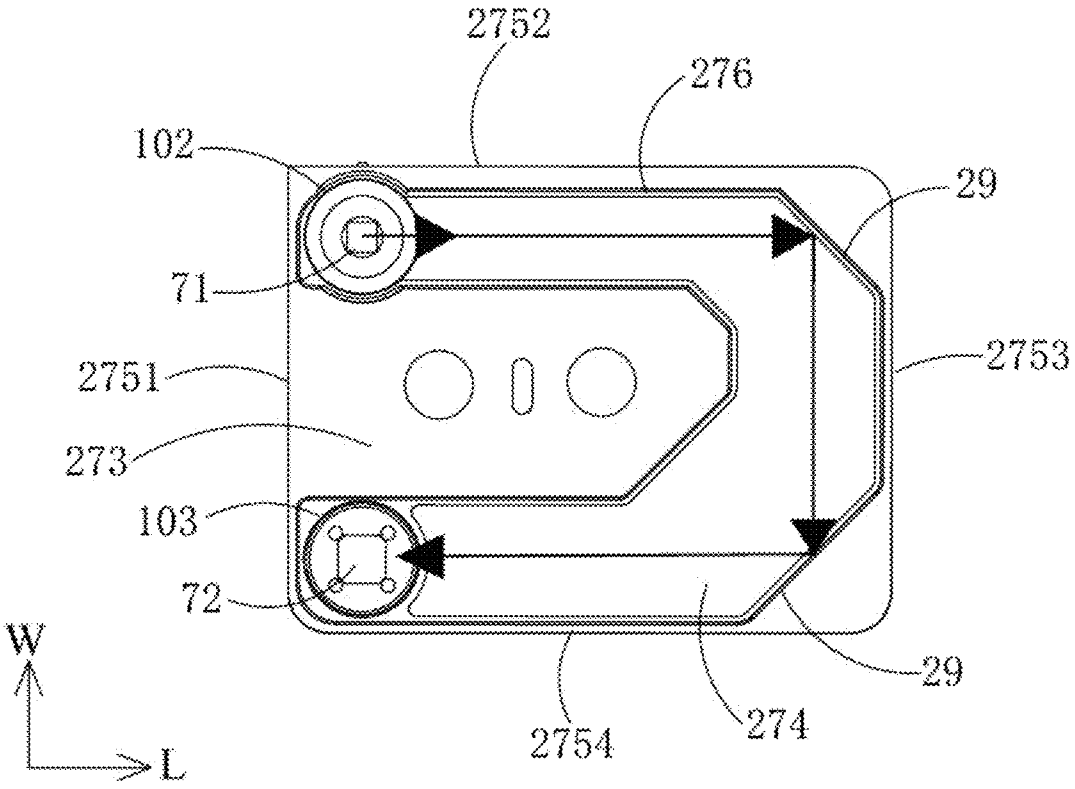
FIG. 24 is a schematic structural view corresponding to a partial structure of the detection unit provided by an embodiment of the present disclosure from a top view.
Figure 25:
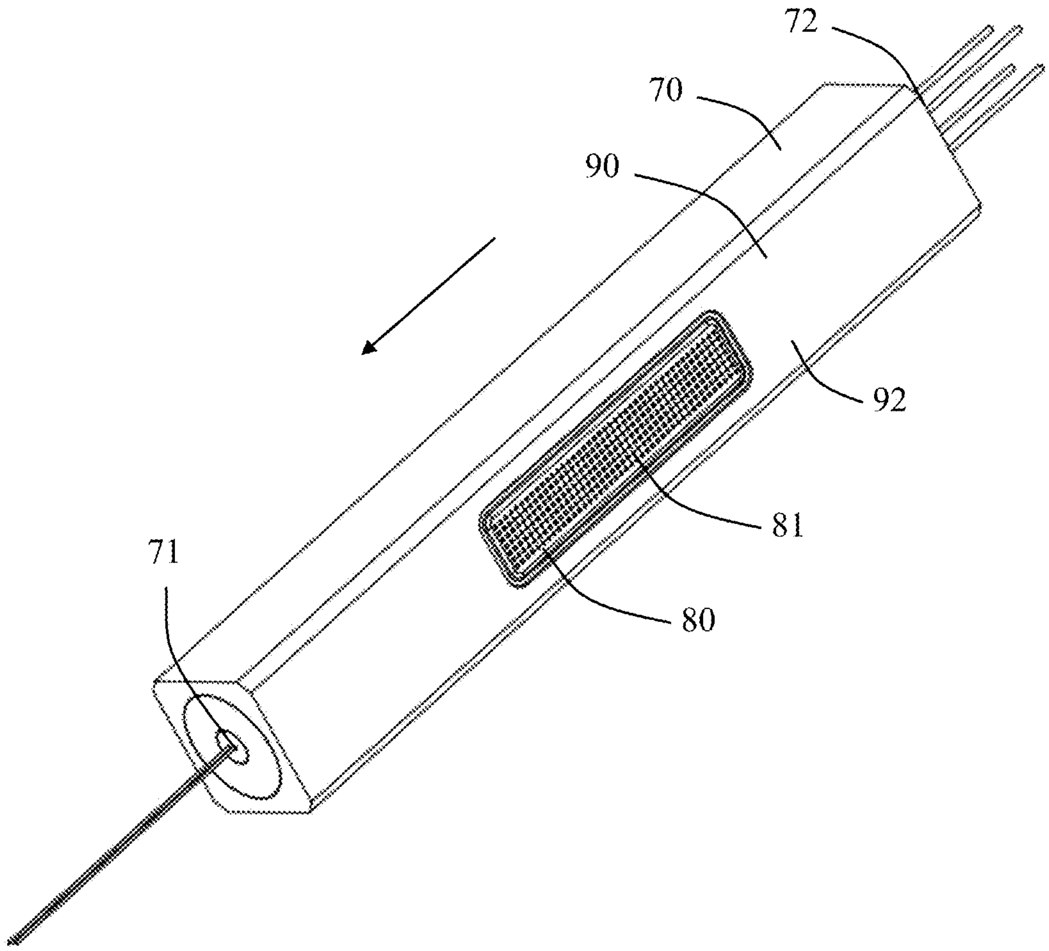
FIG. 25 is a schematic view of the detection unit provided by another embodiment of the present disclosure.

Referring to FIG. 24, in some embodiments of the present disclosure, a cross-section of the second body 27 is generally a rounded rectangle. The second body 27 includes a peripheral side wall 275 extending away from an edge of the transverse wall portion 271 away from the first body 26. The peripheral side wall 275 circumferentially surrounds the third cavity 104. The peripheral side wall 275 includes a first side wall 2751, a second side wall 2752, a third side wall 2753 and a fourth side wall 2754 which are connected in sequence. The first side wall 2751 and the third side wall 2753 are respectively located on different sides in a length direction of the second body 27. The second side wall 2752 and the fourth side wall 2754 are respectively located on different sides in a width direction of the second body 27. The first side wall 2751 and the third side wall 2753 are a set of parallel side walls. The second side wall 2752 and the fourth side wall 2754 are a set of parallel side walls.

Among four intersections formed by the plurality of side walls, the first cavity 102 is closer to an intersection of the first side wall 2751 and the second side wall 2752, and the second cavity 103 is closer to an intersection of the first side wall 2751 and the fourth side wall 2754. Therefore, the light source module 71 and the detection probe 72 are respectively located at two corner positions of the second body 27.

In some embodiments of the present disclosure, the through portion 53 is farther from the second side wall 2752 than the first cavity 102. The through portion 53 is further away from the fourth side wall 2754 than the second cavity 103. The through portion 53 is closer to the third side wall 2753 than the first cavity 102. In this way, the through portion 53 is located approximately at a center of the second body 27, which is beneficial to improve the strength of the two main bodies to be connected. Part of the wall surface of the fitting portion 274 forming the gas chamber 700 is located between the through portion 53 and the second side wall 2752; Part of the wall surface of the fitting portion 274 forming the gas chamber 700 is located between the through portion 53 and the third side wall 2753; and another part of the wall surface of the fitting portion 274 forming the gas chamber 700 is located between the through portion 53 and the fourth side wall 2754. This can make full use of space and extend the optical path. After the light is emitted from the light source module 71, it needs to undergo a plurality of reflections and bends before it reaches the detection probe 72, which is beneficial to extend the optical path.

Regarding the reflected light path of the present disclosure, in an optional implementation, axial directions of the first cavity 102 and the second cavity 103 are parallel. The plurality of reflective surfaces 29 are provided on a surface of the recessed portion 261 exposed to the gas chamber 700. The light emitted by the light source module 71 can be finally transmitted to the detection probe 72 after being reflected a plurality of times by the reflective surfaces 29. The plurality of reflective surfaces 29 include a first reflective surface 291 and a second reflective surface 292. The light source module 71 faces the first reflective surface 291, and the detection probe 72 faces the second reflective surface 292. The first reflective surface 291 and the second reflective surface 292 are both inclined away from the second body 27 relative to the surface of the first mounting portion 51 close to the second body 27, and an angle of inclination of the first reflective surface 291 is greater than an angle of inclination of the second reflective surface 292. Referring to FIG. 22 and FIG. 23, an angle at which the first reflective surface 291 is inclined away from the second body 27 relative to the surface of the first mounting portion 51 close to the second body 27 is denoted as $\beta 1$; and an angle at which the second reflective surface 292 is inclined away from the second body 27 relative to the surface of the first mounting portion 51 close to the second body 27 is denoted as $\beta 2$, wherein $\beta 1$ is greater than $\beta 2$. The advantage of this arrangement is that for the detection probe 72 that receives the light, the more light that enters the detection probe 72, the better the detection of light energy can be achieved to a certain extent. However, $\beta 2$ is relatively small, and an emission area of the light at the second reflective surface 292 is larger. That is, the second reflective surface 292 can reflect more light to the detection probe 72. For the light source module 71 that emits the light, the light emitted by the light source module 71 is reflected at the first reflective surface 291 with a larger tilt angle. An incident area of the light at the first reflective surface 291 is smaller, so that the first reflective surface 291 can increase the concentration of the light source module 71. In some embodiments of the present disclosure, the angle of $\beta 1$ is 45° and the angle of $\beta 2$ is 30°.

In the embodiment of the present disclosure, as shown in FIG. 25 to FIG. 29, the detection unit 21 further includes a cover plate 80 and a waterproof and breathable membrane 30. The waterproof and breathable membrane 30 is located between the detection housing 70 and the cover plate 80. The detection housing 70 has a side wall 90 located at the periphery of the gas chamber 700. The side wall 90 includes a first outer wall 92 and a second outer wall 93. Along the length direction perpendicular to the detection housing 70, the first outer wall 92 and the second outer wall 93 are respectively located on two sides of the gas chamber 700. In some embodiments, the first outer wall 92 and the second outer wall 93 are arranged opposite and parallel to each other. The side wall 90 has a first hole portion 91 which defines a fitting hole 701 extending through the side wall 90. The fitting hole 701 gaseously communicates with the gas chamber 700 and an outside of the detection housing 70. Both the first outer wall 92 and the second outer wall 93 are provided with the first hole portions 91. Both the first outer wall 92 and the second outer wall 93 are provided with recessed portions 94. The recessed portions 94 are recessed from the outer surface of the detection housing 70 toward an interior of the detection housing 70. The first hole portion 91 is located between the recessed portions 94 and the gas chamber 700.

Referring to FIG. 25 to FIG. 29, the cover plate 80 and the side wall 90 are welded. Welding is a manufacturing process that uses heat, temperature, or pressure to join metals or other thermoplastic materials. In some embodiments, the cover plate 80 and the detection housing 70 are both made of metal, or both are made of a thermoplastic material.

Figure 26:
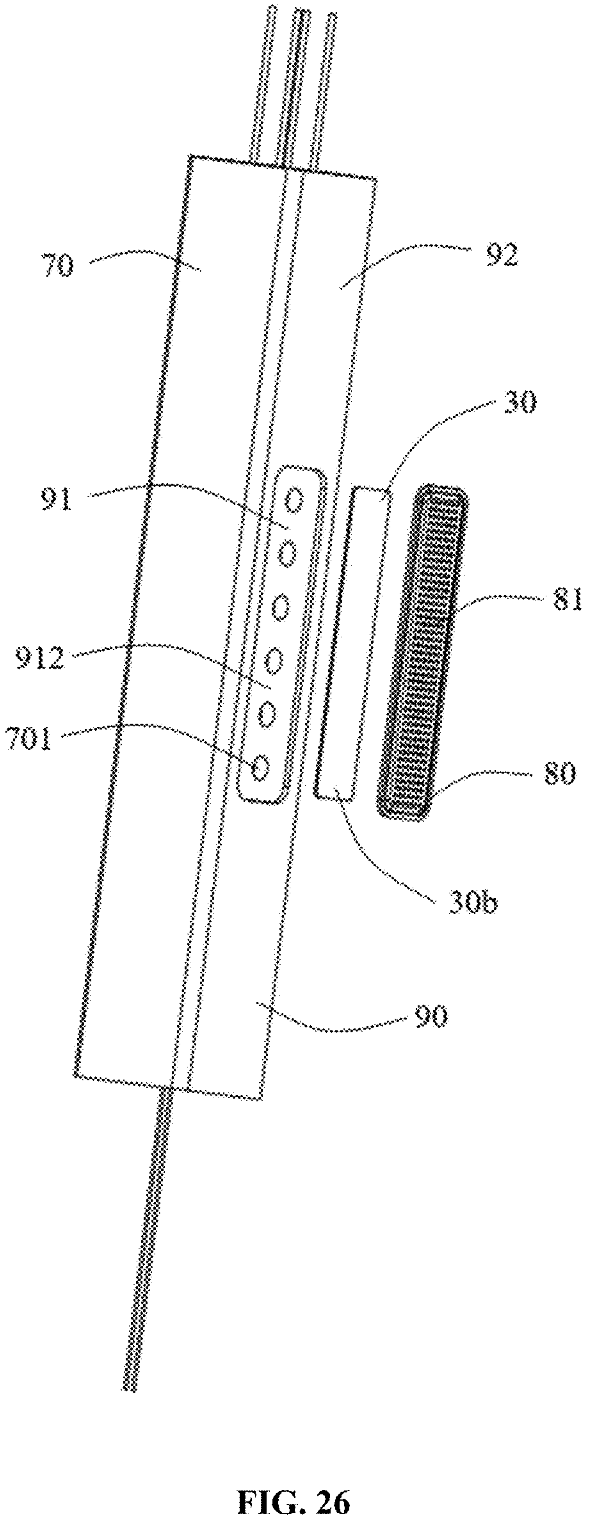
FIG. 26 is a partially exploded schematic structural view of the detection unit in an embodiment of the present disclosure.
Figure 29:
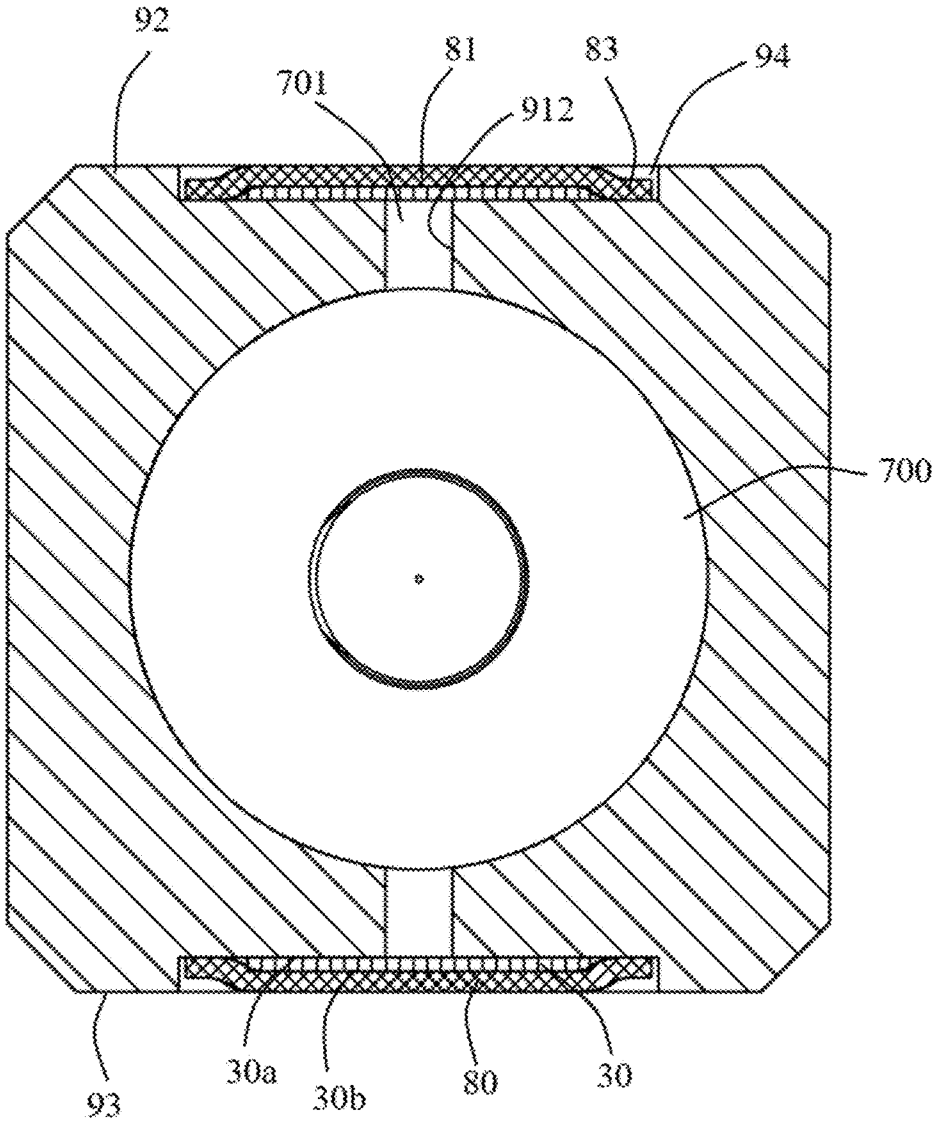
FIG. 29 is a schematic cross-sectional structural view of the detection unit in an embodiment of the present disclosure.

Referring to FIG. 26 and FIG. 29, the cover plate 80 covers the first hole portion 91. The cover plate 80 has a plurality of second hole portions 81. The second hole portion 81 includes a gas hole 811 extending through the cover plate 80. At least part of the waterproof and breathable membrane 30 is located between the side wall 90 and the cover plate 80. At least part of the waterproof and breathable membrane 30 is located between the first hole portion 91 and the second hole portion 81. In this way, the waterproof and breathable membrane 30 is sandwiched between the side wall 90 and the cover plate 80. The outside gas can enter the gas chamber

700 through the gas hole 811, the waterproof and breathable membrane 30 and the fitting hole 701 in sequence.

In the embodiment of the present disclosure, the detection housing 70 includes a first wall 912 located at a periphery of the fitting hole 701. Along an extending direction of the fitting hole 701, the projection of the first wall surface 912 on the cover plate 80 is located within the outer contour of the cover plate 80. The projection of the first wall surface 912 on the waterproof and breathable membrane 30 is located within the outer contour of the waterproof and breathable membrane 30. In this way, the first hole portion 91 is fully covered by the cover plate 80, and the first hole portion 91 is fully covered by the waterproof and breathable membrane 30, which can reduce external water molecules from entering the gas chamber 700 through the fitting hole 701.

In the embodiment of the present disclosure, the cover plate 80 includes a second wall 812 located at the periphery of the gas hole 811. Along an extending direction of the gas hole 811, the projection of the second wall surface 812 on the waterproof and breathable membrane 30 is located within the outer contour of the waterproof and breathable membrane 30. In this way, the second hole portion 81 is completely covered by the waterproof and breathable membrane 30.

Figure 28:
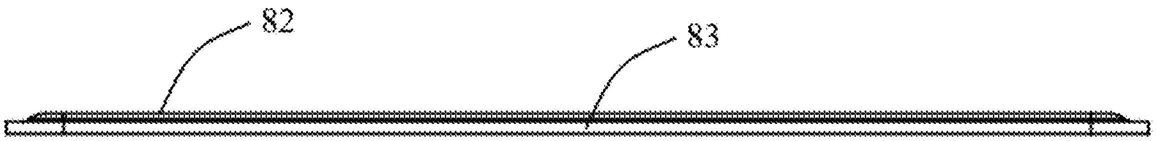
FIG. 28 is a schematic side structural view of the cover plate provided in an embodiment of the present disclosure.

As shown in FIG. 28 and FIG. 29, the cover plate 80 includes a filter portion 82 and a connecting portion 83. The second hole portion 81 is provided on the filter portion 82. The filter portion 82 is connected to the connecting portion 83. The connecting portion 83 is located on a periphery of the filter portion 82. The connecting portion 83 is connected to the side wall 90. The filter portion 82 and the connecting portion 83 are not on a same plane. The filter portion 82 is away from the side wall 90 relative to the connecting portion 83, so that there is a gap between the filter portion 82 and the side wall 90 for receiving the waterproof and breathable membrane 30. The connecting portion 83 is located on a periphery of the waterproof and breathable membrane 30. In this way, a horizontal movement of the waterproof and breathable membrane 30 between the side wall 90 and the cover plate 80 can be reduced. In some embodiments, the cover plate 80 is entirely a filter structure. That is, both the filter portion 82 and the connecting portion 83 have filter structures.

As shown in FIG. 29, the filter portion 82 and the connecting portion 83 are provided integrally. The connecting portion 83 is formed by bending a peripheral edge of the filter portion 82. Furthermore, along the extending direction of the fitting hole 701, the projection of the first hole portion 91 on the cover plate 80 is located within the outer contour of the cover plate 80. That is, the cover plate 80 completely covers the first hole portion 91. The cover plate 80 is located at least partially within the recessed portion 94. In some embodiments, the connecting portion 83 is located within the recessed portion 94. In some embodiments, the cover plate 80 is located within recessed portion 94. In this way, the installation of the cover plate 80 and the detection housing 70 is facilitated.

Figure 27:
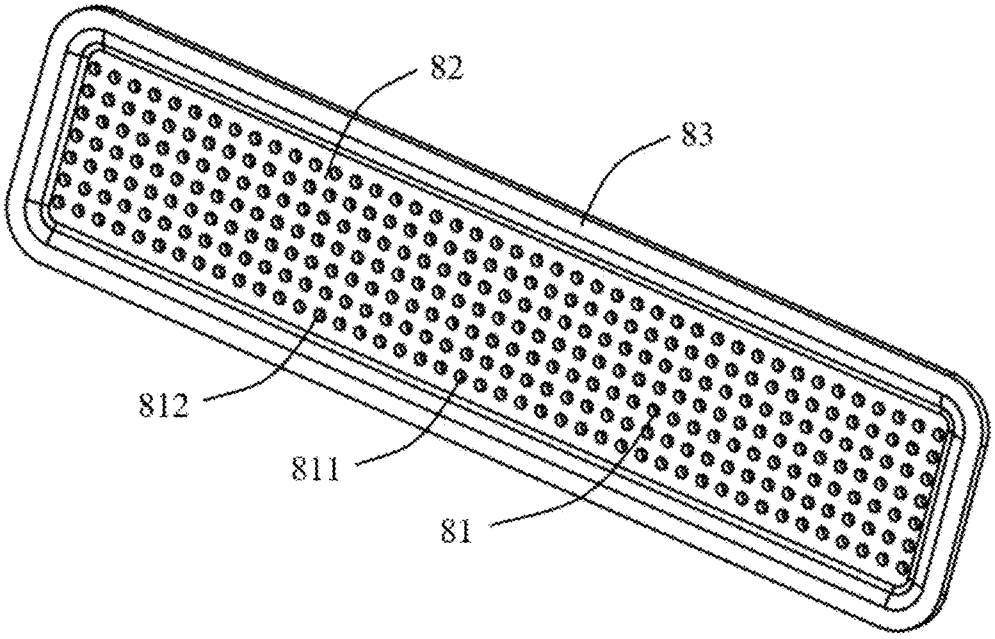
FIG. 27 is a schematic structural view of a cover plate provided in an embodiment of the present disclosure.

In the embodiment of the present disclosure, the projection of the waterproof and breathable membrane 30 on the cover plate 80 is located within the outer contour of the cover plate 80. That is, the cover plate 80 completely covers the waterproof and breathable membrane 30. Furthermore, the projection of the waterproof and breathable membrane 30 on the filter portion 82 is located within the outer contour of the filter portion 82, or the projection of the waterproof and breathable membrane 30 on the filter portion 82 overlaps with the outer contour of the filter portion 82, for example, as shown in FIG. 27 to FIG. 29. The connecting portion 83 is formed by bending the peripheral edge of the filter portion 82. In this way, a gap for receiving the waterproof and breathable membrane 30 is formed between the filter portion 82 and the side wall 90, thereby reducing the horizontal movement of the waterproof and breathable membrane 30 between the side wall 90 and the cover plate 80. In this specific embodiment, the waterproof and breathable membrane 30 is completely located within the recessed portion 94, and the cover plate 80 is also completely located within the recessed portion 94. The waterproof and breathable membrane 30 has a first surface 30*a* and a second surface 30*b*. The first surface 30*a* is in contact with the side wall 90. The second surface 30*b* is in contact with the cover plate 80. There is no gap between the waterproof and breathable membrane 30 and the first hole portion 91. There is also no gap between the waterproof and breathable membrane 30 and the second hole portion 81. That is, the waterproof and breathable membrane 30 is sandwiched between the side wall 90 and the cover plate 80. In this way, a radial movement of the waterproof and breathable membrane 30 between the first hole portion 91 and the second hole portion 81 can be reduced. The outer surface of the filter portion 82 is flush with the portion of the side wall 90 except the recessed portion 94. In this way, fluid needs to pass through the gas hole 811, the waterproof and breathable membrane 30 and the fitting hole 701 in sequence at one time. It is difficult for the liquid to enter the interior of the detection unit 21, thereby greatly improving the waterproof effect.

In the embodiment of the present disclosure, the cover plate 80 is welded to the outer surface of the side wall 90. Specifically, the connecting portion 83 is welded to the outer surface of the recessed portion 94. In this way, the waterproof and breathable membrane 30 can be fixed between the detection housing 70 and the cover plate 80, effectively reducing the risk of the waterproof and breathable membrane 30 falling off.

Referring to FIG. 29, the first outer wall 92 and the second outer wall 93 are arranged opposite and parallel to each other. The fitting hole 701 on the first outer wall 92 is opposite to the fitting hole 701 on the second outer wall 93. In this way, the circulation of gas in the gas chamber 700 is facilitated. Of course, the present invention does not limit the inflow and outflow directions of the gas.

Based on the above embodiment, at least two fitting holes 701 are provided and extend in the same direction. At least two gas holes 811 are provided and extend in the same direction. This allows the gas to circulate evenly. An extending direction of the fitting hole 701 is the same as an extending direction of the gas hole 811. In this way, the gas circulation efficiency is higher, thereby improving the overall efficiency of the detection unit 21. An inner diameter of the gas hole 811 is smaller than an inner diameter of the fitting hole 701. In this way, the gas hole 811 and the waterproof and breathable membrane 30 block liquid from the outside. After the gas passes through the gas hole 811 and the waterproof and breathable membrane 30, the inner diameter of the fitting hole 701 is larger, so that the gas can enter the gas chamber 700 more easily, thereby improving the overall efficiency of the gas detection device. In addition, the inner diameter of the gas hole 811 is smaller than the inner diameter of the fitting hole 701, which can also effectively block external impurities, thereby reducing the impact of the external impurities adhering to the waterproof and breathable membrane 30 and affecting the passage of gas through the waterproof and breathable membrane 30.

Furthermore, referring to FIG. 26 and FIG. 29, in addition to the first outer wall 92 and the second outer wall 93, the side wall 90 further includes other side walls connecting the first outer wall 92 and the second outer wall 93. There are at least two other side walls, so that the first outer wall 92, the second outer wall 93 and the other side walls form a closed loop. In this specific embodiment, the side wall 90 includes a first outer wall 92, a second outer wall 93 and two other side walls, so that the outer surface of the detection housing 70 is formed into a rectangular parallelepiped shape. Of course, in other embodiments, the detection housing 70 may also be in other shapes instead of a fixed rectangular parallelepiped shape. The rectangular shape is used in this specific embodiment not only to facilitate the installation and fixation of the entire detection unit 21, but also to make the entire structure more symmetrical and regular with a sufficiently long optical path to make the gas detection device more efficient.

In other embodiments, other side walls are also provided with the first hole portion 91 and the recessed portion 94. The cover plate 80 and the waterproof and breathable membrane 30 are placed in the recessed portion 94. In this way, while ensuring the waterproof effect of the entire detection unit 21, the gas flow efficiency is improved.

The detection housing 70 and the cover plate 80 are integrally connected. The waterproof and breathable membrane 30 is sealed between the detection housing 70 and the cover plate 80. This integrally connected detection unit 21 has high sensitivity and excellent sealing performance.

In an embodiment of the present disclosure, the detection housing 70 and the cover plate 80 are both made of metal, and the detection housing 70 and the cover plate 80 are integrally connected by laser welding. No additional buckle structure is required, and the entire waterproof and breathable membrane 30 is sealed very firmly. In another specific embodiment, the detection housing 70 and the cover plate 80 are both made of plastic material, and the detection housing 70 and the cover plate 80 are integrally connected through ultrasonic welding. No additional buckle structure is required as well, and the entire waterproof and breathable membrane 30 is sealed very firmly. When high temperature resistance is required in practical applications, the detection housing 70 and the cover plate 80 are made of metal, and the welding process is laser welding. When the detection housing 70 and the cover plate 80 are made of plastic, the inner wall of the detection housing 70 needs to be polished and then gold-plated. This is done so that the infrared light can be completely reflected in the gas chamber 700 so that the infrared light will not be scattered and cause inaccurate detection.

The above embodiments are only used to illustrate the present disclosure and do not limit the technical solutions described in the present disclosure. The understanding of the present disclosure should be based on those skilled in the art. Although the present disclosure has been described in detail with reference to the above-mentioned embodiments, those skilled in the art should understand that those skilled in the art can still make modifications or equivalent substitutions to the present disclosure. All technical solutions and improvements that do not deviate from the spirit and scope of the present disclosure shall be covered by the claims of the present disclosure.

What is claimed is:

1. A gas detection device, comprising:

a housing;

a circuit board, at least part of the circuit board being located in the housing; and a detection unit being mounted to the circuit board, at least part of the detection unit being located in the housing;

wherein the detection unit comprises a detection housing, a light source module and a detection probe; the light source module is disposed at one end of the detection housing in a length direction of the detection housing to emit light; the detection probe is disposed at another end of the detection housing in the length direction of the detection housing to receive the light; the light source module and the detection probe are electrically connected to the circuit board, respectively;

a first straight line and a second straight line are defined on a plane perpendicular to a height direction of the gas detection device; the detection housing has a first projection on the plane; the first straight line extends along a length direction of the first projection; the second straight line extends along a width direction or a length direction of the gas detection device; the first straight line is inclined at an acute angle relative to the second straight line;

wherein a center line of the detection housing along the length direction of the detection housing intersects and is not perpendicular to a plane perpendicular to the height direction of the gas detection device.

2. The gas detection device according to claim 1, wherein the housing comprises a first housing and a second housing; the first housing comprises a first wall portion and a first peripheral wall vertically extending from the first wall portion; the second housing comprises a second wall portion and a second peripheral wall vertically extending from the second wall portion; the first wall portion and the second wall portion are respectively located on different sides of the circuit board in a thickness direction of the circuit board;

the first peripheral wall and the second peripheral wall are fixedly connected or limitedly connected; the circuit board is fixed to the second housing; the second peripheral wall circumferentially surrounds the circuit board; the detection unit is at least partially located between the circuit board and the first wall portion.

3. The gas detection device according to claim 2, wherein the second peripheral wall comprises a first sub-wall, a second sub-wall, a third sub-wall and a fourth sub-wall; the first sub-wall and the third sub-wall are disposed in parallel; the second sub-wall and the fourth sub-wall are disposed in parallel; the second peripheral wall further comprises a first corner wall connected between the first sub-wall and the second sub-wall, a second corner wall connected between the second sub-wall and the third sub-wall, a third corner wall connected between the third sub-wall and the fourth sub-wall, and a fourth corner wall connected between the fourth sub-wall and the first sub-wall;

in the length direction of the detection housing, the detection unit is located between the first corner wall and the third corner wall, or the detection unit is located between the second corner wall and the fourth corner wall.

4. The gas detection device according to claim 3, wherein a shape of the circuit board is a regular rectangle adapted to the second housing; the circuit board is provided with a first corner hole and a second corner hole;

the second housing further comprises a positioning post and a support post, the positioning post and the support post both extend vertically from the second wall portion;

the positioning post mates with the first corner hole, and at least part of the positioning post is located in the first corner hole; the support post mates with the second corner hole, and the support post defines a threaded hole extending along the thickness direction of the circuit board; the threaded hole is coaxial with the second corner hole;

the gas detection device further comprises a screw, and the screw is inserted through the second corner hole to be screw-fitted with the threaded hole.

5. The gas detection device according to claim 4, wherein the gas detection device further comprises a first metal shielding case, a second metal shielding case and a plurality of electronic components; the plurality of electronic components and the detection unit are mounted on different sides of the circuit board, respectively, in the thickness direction of the circuit board;

the first metal shielding case comprises a first plate body and a first support leg; the second metal shielding case comprises a second plate body and a second support leg; the first plate body is erected on a side of the detection unit away from the circuit board; the second plate body is erected on a side of the plurality of electronic components away from the circuit board; the first support leg extends from the first plate body toward the circuit board; the second support leg extends from the second plate body toward the circuit board;

the first support leg and the second support leg are both provided with through holes; the through hole of the first support leg, the through hole of the second support leg, the threaded hole and the second corner hole are aligned along the thickness direction of the circuit board; the screw passes through the through hole of the first support leg, the through hole of the second support leg and the second corner hole to be screw-fitted with the threaded hole; the first support leg and the second support leg are both electrically connected to a ground terminal of the circuit board.

6. The gas detection device according to claim 5, wherein the circuit board is provided with two first corner holes, a diagonal direction of the two first corner holes is in a same direction as the length direction of the detection housing, and the detection unit is located between the two first corner holes.

7. The gas detection device according to claim 2, wherein the detection unit further comprises a first adapter board and a second adapter board; each of the first adapter board and the second adapter board has a mounting body and an insertion portion; the circuit board defines insertion holes respectively corresponding to the two insertion portions; the insertion portions are at least partially located in the insertion holes; the mounting body is located between the first wall portion and the circuit board; pins of the light source module are welded to the mounting body of the first adapter board; pins of the detection probe are welded to the mounting body of the second adapter board; the first adapter board and the second adapter board are both welded to the circuit board.

8. The gas detection device according to claim 7, wherein the detection unit further defines a gas chamber; the detection housing is provided on a periphery of the gas chamber; the detection housing defines a fitting hole in communication with the gas chamber;

two ends of the detection housing in the length direction of the detection housing have a first mounting area and a second mounting area, respectively;

the light source module is at least partially located in the first mounting area; an outer peripheral wall of the light source module is bonded and fixed to an inner peripheral wall of the detection housing in the first mounting area; the detection probe is at least partially located in the second mounting area; an outer peripheral wall of the detection probe is bonded and fixed to the inner peripheral wall of the detection housing in the second mounting area; the first adapter board and the second adapter board are in contact with end surfaces on two sides of the detection housing, respectively, in the length direction of the detection housing;

the light source module has a light emitting side; the detection probe has a light receiving side; the light emitting side is disposed facing the light receiving side; the gas chamber is located between the light emitting side and the light receiving side;

the light source module is a MEMS type blackbody light source; a wave peak range of an infrared light emitted by the light source module is 1 μm to 16 μm; the detection probe is a pyroelectric-type or thermopile-type infrared detection probe; the detection probe defines a detection channel and a reference channel set independently of each other.

9. The gas detection device according to claim 2, wherein the first wall portion has a first ventilation portion; the first peripheral wall has a second ventilation portion;

the gas detection device further comprises a support member, and a first membrane body and a second membrane body which are waterproof and breathable; the support member comprises a first support portion and a second support portion; the first support portion and the second support portion are of an integral structure;

the first membrane body covers at least part of the first ventilation portion, and a peripheral portion of the first membrane body is sandwiched and positioned between the first wall portion and the first support portion; the second membrane body covers at least part of the second ventilation portion, and a peripheral portion of the second membrane body is sandwiched and positioned between the first peripheral wall and the second support portion.

10. A gas detection device, comprising:

a housing;

a circuit board, at least part of the circuit board being located in the housing; and a detection unit being mounted to the circuit board, at least part of the detection unit being located in the housing;

wherein the detection unit comprises a detection housing, a light source module and a detection probe; the light source module is disposed at one end of the detection housing in a length direction of the detection housing to emit light; the detection probe is disposed at another end of the detection housing in the length direction of the detection housing to receive the light; the light source module and the detection probe are electrically connected to the circuit board, respectively;

a first straight line and a second straight line are defined on a plane perpendicular to a height direction of the gas detection device; the detection housing has a first projection on the plane; the first straight line extends along a length direction of the first projection; the second straight line extends along a width direction or a length direction of the gas detection device; the first straight line is inclined at an acute angle relative to the second straight line;

wherein the detection unit defines a gas chamber; the detection housing is disposed on a periphery of the gas chamber; the detection unit further comprises a cover plate and a waterproof and breathable membrane;

the detection housing comprises a side wall located at the periphery of the gas chamber; the side wall comprises a first hole portion which defines a fitting hole extending through the side wall; the fitting hole gaseously communicates with the gas chamber and an outside of the detection unit;

the cover plate is welded to the side wall; the cover plate comprises a second hole portion which defines a gas hole extending through the cover plate;

at least part of the waterproof and breathable membrane is located between the first hole portion and the second hole portion.

11. The gas detection device according to claim 10, wherein the detection housing comprises a first wall forming the fitting hole; along an extending direction of the fitting hole, a projection of the first wall surface on the cover plate is located within an outer contour of the cover plate, and a projection of the first wall surface on the waterproof and breathable membrane is located within an outer contour of the waterproof and breathable membrane.

12. The gas detection device according to claim 10, wherein the cover plate comprises a filter portion and a connecting portion; the second hole portion is provided on the filter portion; the filter portion is connected to the connecting portion; the connecting portion is located at a periphery of the filter portion; the filter portion is away from the side wall relative to the connecting portion; the connecting portion is connected to the side wall; the connecting portion is located on a periphery of the waterproof and breathable membrane.

13. The gas detection device according to claim 10, wherein the side wall comprises a first outer wall and a second outer wall; along a direction perpendicular to the length direction of the detection housing, the first outer wall and the second outer wall are located on two sides of the gas chamber, respectively; each of the first outer wall and the second outer wall is provided with the first hole portion.

14. The gas detection device according to claim 10, wherein the side wall comprises a recessed portion which is recessed from an outer surface of the detection housing toward an interior of the detection housing; the first hole portion is located between the recessed portion and the gas chamber; at least part of the cover plate is located in the recessed portion.

15. The gas detection device according to claim 10, wherein the first hole portion comprises at least two fitting holes extending in a same direction; and the second hole portion comprises at least two gas holes extending in a same direction.

16. A gas detection device, comprising:

a housing;

a circuit board, at least part of the circuit board being located in the housing; and a detection unit being mounted to the circuit board, at least part of the detection unit being located in the housing;

wherein the detection unit comprises a detection housing, a light source module and a detection probe; the light source module is disposed at one end of the detection housing in a length direction of the detection housing to emit light; the detection probe is disposed at another end of the detection housing in the length direction of the detection housing to receive the light; the light source module and the detection probe are electrically connected to the circuit board, respectively;

a first straight line and a second straight line are defined on a plane perpendicular to a height direction of the gas detection device; the detection housing has a first projection on the plane; the first straight line extends along a length direction of the first projection; the second straight line extends along a width direction or a length direction of the gas detection device; the first straight line is inclined at an acute angle relative to the second straight line;

wherein the detection unit defines a gas chamber; the detection housing is disposed on a periphery of the gas chamber; the detection housing comprises a first body and a second body; the gas chamber is located between the first body and the second body;

one body of the first body and the second body comprises a first mounting portion and a protruding portion, and a remaining one body of the first body and the second body comprises a through portion; the protruding portion comprises a first sub-portion and a second sub-portion extending from the first mounting portion toward the remaining one body; the second sub-portion is further away from the first mounting portion than the first sub-portion; at least part of the first sub-portion is provided in the through portion; the second sub-portion is located outside the through portion, and the second sub-portion is set against the through portion.

17. The gas detection device according to claim 16, wherein the first body comprises the first mounting portion and the protruding portion; the second body comprises the through portion; the circuit board is located on one side of the through portion along an axial direction of the through portion, and the first mounting portion is located on another side of the through portion along the axial direction of the through portion; a part of the second body is restricted between the second sub-portion and the first mounting portion.

18. The gas detection device according to claim 17, wherein the first sub-portion comprises a root portion and a middle portion; the root portion is connected between the middle portion and the first mounting portion;

the first sub-portion comprises two middle portions spaced apart from each other and disposed oppositely; an outer peripheral surface of each of two middle portions is in contact with at least part of an inner surface of the through portion;

the second sub-portion comprises two end portions protruding relative to the middle portion in a direction away from an axis of the through portion; one of the two end portions is connected to one of the two middle portions, and the other of the two end portions is connected to the other of the two middle portions; a distance between an outermost side of one end portion in a protruding direction and an outermost side of the other end portion in the protruding direction is greater than an inner diameter of the through portion.

19. The gas detection device according to claim 17, wherein the second body comprises two through portions, the first body comprises two protruding portions; each of the two protruding portions is matched with a corresponding through portion;

the first body further comprises a positioning rod; the positioning rod extends from the first mounting portion in a direction close to the second body; a length of the positioning rod is smaller than a length of the protruding portion; the positioning rod is located between the two protruding portions;

the second body further comprises a positioning hole, and at least part of the positioning rod is received in the positioning hole.

* * * * *